United States Patent
Neta et al.

(10) Patent No.: US 12,533,017 B2
(45) Date of Patent: Jan. 27, 2026

(54) HEAT REMOVAL LOOP IN A MECHANICAL ARM OF A SURGICAL APPARATUS

(71) Applicant: MOMENTIS SURGICAL LTD., Or-Yehuda (IL)

(72) Inventors: Yiftah Neta, Gilon (IL); Yaron Levinson, Tel Aviv (IL); Yoav Harari, Tel Aviv (IL)

(73) Assignee: MOMENTS SURGICAL LTD., Or Yehuda (IL)

( * ) Notice: Subject to any disclaimer, the term of this patent is extended or adjusted under 35 U.S.C. 154(b) by 490 days.

(21) Appl. No.: 18/009,250

(22) PCT Filed: Jun. 10, 2021

(86) PCT No.: PCT/IB2021/055108
§ 371 (c)(1),
(2) Date: Dec. 8, 2022

(87) PCT Pub. No.: WO2021/250607
PCT Pub. Date: Dec. 16, 2021

(65) Prior Publication Data
US 2023/0337902 A1   Oct. 26, 2023

Related U.S. Application Data

(60) Provisional application No. 63/037,018, filed on Jun. 10, 2020.

(51) Int. Cl.
*A61B 1/12*   (2006.01)
*A61B 1/012*   (2006.01)
(Continued)

(52) U.S. Cl.
CPC .............. *A61B 1/128* (2013.01); *A61B 1/015* (2013.01); *A61B 1/051* (2013.01); *A61B 1/12* (2013.01); *A61B 1/012* (2013.01)

(58) Field of Classification Search
None
See application file for complete search history.

(56) References Cited

U.S. PATENT DOCUMENTS

| | | | |
|---|---|---|---|
| 10,039,440 B2 * | 8/2018 | Fenech | A61B 1/00006 |
| 2004/0199052 A1 * | 10/2004 | Banik | A61B 1/0016 600/142 |

(Continued)

FOREIGN PATENT DOCUMENTS

| | | |
|---|---|---|
| CN | 209547956 U | 10/2019 |
| EP | 2941175 A1 | 11/2015 |

(Continued)

*Primary Examiner* — John P Leubecker
(74) *Attorney, Agent, or Firm* — S. J. Intellectual Property Limited

(57) ABSTRACT

A surgical apparatus comprises a flexible and/or articulated arm; a capsule-assembly that is distally connected to the arm, that comprises a liquid-tight shell defining a capsule-assembly-interior, and that has heat-producing imaging and/or electronic component(s) disposed within its interior; and a conduit-array, the conduit-array and a portion of the capsule-assembly-interior that is outside of the conduit-array collectively forming a liquid-sealed closed flow-loop for convective removal of heat from the capsule-assembly-interior, the closed flow-loop comprising arm-disposed section(s) of the conduit-array which are at least partly disposed along and/or within the arm and which collectively longitudinally span, twice and in-parallel, at least a majority of a lengthwise majority of the arm.

20 Claims, 8 Drawing Sheets

(51) Int. Cl.
*A61B 1/015* (2006.01)
*A61B 1/05* (2006.01)

(56) References Cited

U.S. PATENT DOCUMENTS

| | | | | |
|---|---|---|---|---|
| 2005/0222499 | A1* | 10/2005 | Banik | A61B 1/0676 600/156 |
| 2006/0173244 | A1* | 8/2006 | Boulais | A61B 1/015 600/156 |
| 2007/0015962 | A1* | 1/2007 | Bob | A61B 1/12 600/103 |
| 2007/0182842 | A1 | 8/2007 | Sonnenschein et al. | |
| 2007/0249907 | A1* | 10/2007 | Boulais | A61B 1/0676 600/179 |
| 2008/0269561 | A1 | 10/2008 | Banik et al. | |
| 2009/0030325 | A1* | 1/2009 | Hyuga | A61B 8/4488 600/459 |
| 2009/0253957 | A1* | 10/2009 | Yasunaga | A61B 1/05 600/109 |
| 2009/0259103 | A1* | 10/2009 | Hirata | A61B 1/128 600/114 |
| 2009/0315986 | A1* | 12/2009 | Ohara | A61B 1/05 348/E7.085 |
| 2010/0087712 | A1* | 4/2010 | Ito | A61B 1/12 600/160 |
| 2010/0317922 | A1* | 12/2010 | Kumai | A61B 1/00068 600/156 |
| 2011/0295070 | A1* | 12/2011 | Yasunaga | A61B 1/015 600/157 |
| 2013/0131451 | A1* | 5/2013 | Dillinger | A61B 1/128 600/127 |
| 2014/0142384 | A1* | 5/2014 | Chung | A61B 1/005 600/117 |
| 2015/0080933 | A1* | 3/2015 | Igov | A61B 1/018 606/190 |
| 2016/0038013 | A1 | 2/2016 | Czupalla et al. | |
| 2017/0071687 | A1 | 3/2017 | Cohen et al. | |
| 2017/0231701 | A1 | 8/2017 | Cohen et al. | |
| 2020/0142013 | A1 | 5/2020 | Wong | |
| 2020/0245855 | A1* | 8/2020 | Tamura | A61B 1/00119 |
| 2021/0045620 | A1* | 2/2021 | Kohno | A61B 1/0684 |
| 2022/0257106 | A1* | 8/2022 | Salman | A61B 1/06 |

FOREIGN PATENT DOCUMENTS

| | | |
|---|---|---|
| JP | 2003038437 A | 2/2003 |
| JP | 2006521882 A | 9/2006 |
| JP | 2007229261 A | 9/2007 |
| JP | 2007296047 A | 11/2007 |
| JP | 2010201023 A | 9/2010 |
| TW | 202005599 A | 2/2020 |

* cited by examiner

DETAIL A FROM FIG. 12A
WITH CAPSULE-COVERING 323 REMOVED

HEAT REMOVAL LOOP IN A MECHANICAL ARM OF A SURGICAL APPARATUS

CROSS-REFERENCE TO RELATED APPLICATIONS

This invention claims the benefit of U.S. Provisional Patent Application No. 63/037,018 filed on Jun. 10, 2020, which is incorporated herein by reference in its entirety.

FIELD OF THE INVENTION

The present invention relates generally to the area of minimally invasive surgery and more specifically to heat management of heat producing surgical devices such as imaging systems and methods of use thereof.

BACKGROUND

It is well established that there are benefits of minimally invasive surgery. Instruments for such surgery typically have a surgical end effector located at the distal end of an articulated surgical arm (preferably with minimum diameter) that is inserted through a small opening (e.g., body wall incision, natural orifice) to reach a surgical site. In some instances, an endoscope can be used to provide images of the surgical site. In some cases, surgical arms have one or more bending portions which are controlled with mechanical cables whose longitudinal movement affect bending and ultimately control the location of the end effector and change its orientation with reference to the surgical arm's longitudinal axis. In some case, the surgical arm is capable of retroflected bending and/or rotation relative to the surgical arm longitudinal axis.

Surgical arms have been developed that utilize a chip on tip approach having image sensors and associated lighting that are arranged in the distal region of the endoscope shaft for acquiring high resolution in-situ images, said images using miniaturized electronic and/or imaging components. Recently, more advanced image sensors have been developed which have high light sensitivity and resolution, for example, the CMOS (complementary metal oxide semiconductor) image sensor. In addition, in order to substantially improve the degree of illumination and contrast, the more recent use of powerful light-emitting diodes or laser diodes is also desirable. However, these light-emitting diodes and/or high-resolution imaging sensor, also develop a high degree of heat output, which makes sufficient cooling necessary in order to meet the regulatory standard governing maximum heat output. Cooling or heat dissipation is made especially challenging within the limited available size restrictions in MIS surgical tools, flexibility requirements of a flexible (and/or articulated) surgical arm and also maintaining sterility requirements in a surgical setting.

SUMMARY

According to embodiments disclosed herein, system for removing heat from a heat-producing component of a mechanical arm comprises: (a) an inner shell surrounding the distal heat-producing component to define a capsule; (b) an outer shell surrounding the inner shell to form an annular gap therebetween; (c) a conduit-array, comprising respective first and second distal orifices in fluid communication with said annular gap and with each other therethrough; and (d) a circulation mechanism configured for introducing a fluid into said annular gap via said first distal orifice and for evacuating said fluid from said annular gap via said second distal orifice, such that said fluid absorbs heat generated by said heat-producing component by passing through said annular gap.

In some embodiments, a lengthwise portion of the conduit-array can be at least partly disposed within and/or along the mechanical arm so as to span at least one flexible arm section.

In some embodiments, the heat-producing component can constitute a part of an imaging arrangement.

In some embodiments, the heat-producing component can constitute a part of a chip-on-tip arrangement.

In some embodiments, the circulation arrangement can comprise a pump displaced proximally from the a least one flexible arm section and mechanically coupled to the fluid.

In some embodiments, a lengthwise majority of the conduit-array can be disposed within the arm.

In some embodiments, the system can additionally comprise an inner casing disposed in the capsule to be in at least indirect thermal communication with the heat-producing component and with the inner shell. In some embodiments, the inner casing can comprise a metal characterized by thermal conductivity of at least 200 W/mK. In some embodiments, the system can additionally comprise a thermal gel or thermal paste disposed within the capsule and/or configured to be in at least indirect thermal communication with the inner shell and with one of: the heat-producing component and the inner casing. In some embodiments, the system can additionally comprise a thermal gel or thermal paste disposed within the capsule and/or configured to be in at least indirect thermal communication with the inner shell and with at least one of: the heat-producing component and the inner casing.

In some embodiments, the conduit-array can comprise one or more arm-disposed section(s) of the conduit-array which, collectively, longitudinally span, twice and in-parallel, at least a lengthwise majority of the at least one flexible arm section.

In some embodiments, the pump can be selected and/or the conduit-array is shaped for causing a fluid flow through the interior of the outer shell of 10 to 200 ml/sec.

In some embodiments, the pump can be selected and/or the conduit-array can be shaped for causing a fluid flow that maintains a heat transfer coefficient for convective heat transfer from a surface of the capsule to the flowing fluid during operation of the heat-producing component of between 10 and 200 W/m2 k.

According to embodiments disclosed herein, a surgical instrument comprises: (a) an articulated arm having a bendable portion configured to be flexed (i) by an angle of at least 120°, and (ii) such that a radius of curvature after the flexing is at most 3 times the diameter of the bendable portion; (b) a capsule-assembly distally connected to the mechanical arm, the capsule-assembly comprising a liquid-tight shell defining a capsule-assembly-interior, a heat-producing component being disposed within the capsule-assembly-interior; and (c) a forced-heat-convection system comprising (i) one or more conduit-section(s) in fluid communication with the capsule-assembly-interior and (ii) a pump mechanically coupled to a fluid disposed within the one or more conduit-section(s).

In some embodiments, the heat-producing component can include a chip-on-tip imaging instrument.

In some embodiments, the capsule assembly can comprise a capsule disposed therewithin so as to form an air gap between the capsule and the shell, wherein heat is removed via the air gap being formed between a capsule-assembly-interior and conduit-array.

According to embodiments disclosed herein, a surgical apparatus comprises (a) a flexible arm; (b) a capsule-assembly distally connected to the arm, the capsule-assembly comprising a liquid-tight shell defining a capsule-assembly-interior, one or more heat-producing components being disposed within the capsule-assembly-interior; and (c) a conduit-array, the conduit-array and a portion of the capsule-assembly-interior that is outside of the conduit-array collectively forming a liquid-sealed closed flow-loop for convective removal of heat from the capsule-assembly-interior, the liquid-sealed closed flow-loop comprising one or more arm-disposed section(s) of the conduit-array which: (i) are at least partly disposed along and/or within the arm; and (ii) collectively longitudinally span, twice and in-parallel, at least a lengthwise majority of the flexible arm.

In some embodiments, the surgical apparatus can further comprise a positive displacement pump for causing a fluid to flow through the liquid-sealed closed flow-loop to remove by forced-convention, from the capsule-assembly-interior, heat generated by the one or more heat-producing components.

In some embodiments, the arm-disposed sections can comprise at least 75% of the liquid-sealed closed flow-loop.

In some embodiments, a portion of the liquid-sealed closed flow-loop inside of the capsule-assembly-interior and outside of the conduit-array can have a length of at least 5 mm.

In some embodiments, a portion of the liquid-sealed closed flow-loop inside of the capsule-assembly-interior and outside of the conduit-array can have a length of that is equal to at least 50% of a diameter of the capsule-assembly interior.

In some embodiments, the pump can be selected and/or the liquid-sealed closed flow-loop can be shaped for causing a fluid flow through the capsule-assembly-interior of 10 to 200 ml/sec.

In some embodiments, it can be that (i) a capsule is fixedly disposed within the capsule-assembly-interior to define an annular region outside of the capsule and within the shell, and/or (ii) the imaging and/or electronic component(s) are disposed within the capsule so as to seal the imaging and/or electronic component(s) from the annular region.

In some embodiments, the capsule can be repeatably autoclavable.

In some embodiments, an annular-region gap-thickness of between 0.05 mm and 0.6 mm can be sustained over at least 180 degrees of capsule circumference, for at least 1 cm of length of the capsule. In some embodiments, an annular-region gap-thickness of between 0.1 mm and 0.6 mm can be sustained over at least 180 degrees of capsule circumference, for at least 50% of a length of the capsule.

In some embodiments, when a fluid is caused to flow through the conduit-array and into the annular region, a portion of the flowing fluid can longitudinally penetrate the annular region by at least 50% of a length of the capsule assembly.

In some embodiments, the pump can be selected and/or the liquid-sealed closed flow-loop can be shaped for causing a fluid flow that maintains a heat transfer coefficient for convective heat transfer from the capsule surface to the flowing fluid during operation of the surgical apparatus of between 10 and 200 W/m$^2$k.

In some embodiments, a thermal gel and/or thermal paste can be disposed within the capsule to be in at least indirect thermal communication with the one or more heat-producing components and with a capsule-covering of the capsule.

In some embodiments, the surgical apparatus can additionally comprise an inner casing disposed in an interior of the capsule to be in at least indirect thermal communication with the one or more heat-producing components and with a capsule-covering of the capsule. In some embodiments, the inner casing can comprise a metal characterized by thermal conductivity of at least 200 W/mK.

According to embodiments disclosed herein, a surgical apparatus comprises: (a) a flexible arm; (b) a capsule-assembly distally connected to the arm, the capsule-assembly comprising a liquid-tight shell defining a capsule-assembly-interior, one or more heat-producing components being disposed within the capsule-assembly-interior; (c) one or more conduit-sections which: (i) are at least partly disposed along and/or within the arm, (ii) collectively longitudinally span, twice and in-parallel, at least a majority of a lengthwise majority of the arm, and (iii) reach the capsule-assembly; and (d) a pump for forced heat-convection cooling of the capsule-assembly interior, mechanically coupled to fluid disposed within the one or more conduit-sections, wherein the surgical apparatus is configured such that the one or more conduit-sections are part of a liquid-sealed closed fluid-flow loop that is thermally coupled to the capsule assembly.

In some embodiments, the pump can be selected and/or the liquid-sealed closed flow-loop can be shaped for causing a fluid flow through the capsule-assembly-interior of 10 to 200 ml/sec.

In some embodiments, the liquid-sealed closed fluid loop can comprise a portion of the capsule-assembly-interior that is outside of the one or more conduit-sections.

In some embodiments, a capsule can be fixedly disposed within the capsule-assembly-interior to define an annular region outside of the capsule and within the shell.

In some embodiments, the pump can be selected and/or the liquid-sealed closed flow-loop can be shaped for causing a fluid flow that maintains a heat transfer coefficient for convective heat transfer from the capsule surface to the flowing fluid during operation of the surgical apparatus of between 10 and 200 W/m$^2$k.

According to embodiments disclosed herein, a surgical apparatus comprises: (a) a flexible arm; (b) a capsule-assembly distally connected to the arm, the capsule-assembly comprising an outer shell and a capsule disposed therein so as to form an annular gap between the outer shell and the capsule, the capsule including heat-producing components sealed therewithin from the annular gap; and (c) first and second conduit sections having respective first and second distal orifices in direct fluid communication with the capsule-assembly and in indirect fluid communication with each other through the annular gap so that when a fluid is caused to exit the first distal orifice into an interior of the capsule assembly, the fluid traverses the annular gap and exits therefrom into the second distal orifice.

In some embodiments, an annular-region gap-thickness of between 0.05 mm and 0.3 mm can be sustained over at least 180 degrees of capsule circumference, for at least 1 cm of length of the capsule. In some embodiments, the annular gap can have a thickness of at least 0.05 mm and at most 0.3 mm over at least 75% of capsule circumference for at least 20% of a length of the capsule.

In some embodiments, the first and second distal orifices can be at a distance of at least 5 mm from each other.

In some embodiments, the first and second distal orifices can be at a distance from each other that is equal to at least 50% of a diameter of the capsule-assembly interior.

In some embodiments, the capsule can be repeatably autoclavable.

In some embodiments, a thermal gel and/or thermal paste can be disposed within the capsule to be in at least indirect thermal communication with the one or more heat-producing components and with a capsule-covering of the capsule.

In some embodiments, the surgical apparatus can additionally comprise an inner casing disposed in an interior of the capsule to be in at least indirect thermal communication with the one or more heat-producing components and with a capsule-covering of the capsule. In some embodiments, the inner casing can comprise a metal characterized by thermal conductivity of at least 200 W/mK.

According to embodiments disclosed herein, a surgical apparatus comprises: (a) a flexible arm comprising an arm section configured to be flexed by at least 90°; (b) a capsule-assembly distally connected to the arm, the capsule-assembly including a heat-producing component which is heat-producing during operation of the surgical apparatus; and (c) a fluid-transport system for removing heat from the capsule-assembly, the fluid-transport system comprising: (i) a pump displaced proximally from the flexing-configured arm section, and (ii) a conduit-array at least partly disposed within and/or along the arm so as to span at least the flexing-configured arm section.

In some embodiments, the conduit-array can form a fluid-path that is continuous proximally from the capsule assembly through the pump and distally back to the capsule assembly, and discontinuous within the capsule assembly In some embodiments, the flexing-configured arm section can be configured to be flexed by at least 120°.

In some embodiments, the flexing-configured arm section can comprise a retroflex section configured to transition in and out of a retroflex configuration.

In some embodiments, the fluid-transport system can be selected and/or the conduit array can be shaped for causing a fluid flow through an interior volume of the capsule-assembly of 10 to 200 ml/sec.

In some embodiments, when the flexing-configured arm is flexed, the fluid-path can remain continuous proximally from the capsule assembly through the pump and distally back to the capsule assembly.

In some embodiments, when the flexing-configured arm is flexed, a fluid capacity of the fluid-path can be not reduced by more than 30%.

In some embodiments, the capsule-assembly can comprise a capsule that includes the heat-producing component, and the removal of heat from the capsule assembly is by convectively absorbing heat from the capsule in a fluid pumped through the fluid-transport system.

In some embodiments, the fluid-transport system can be configured such that at least 70% of the absorbed heat is lost by the pumped fluid as the pumped fluid traverses the conduit-array.

In some embodiments, the fluid-transport system can be configured such that a first portion of the absorbed heat is lost as the pumped fluid traverses proximally from the capsule assembly through the pump and a second portion of the absorbed heat is lost as the pumped fluid traverses distally from the pump to the capsule assembly.

A method is disclosed, according to embodiments, for removing heat from a flexible surgical arm. According to the method, the arm has a heat-producing component disposed in a capsule-assembly connected distally to the arm. The method comprises: (a) thermally coupling, to the capsule assembly, a forced-convection heat dissipation system comprising (i) a conduit-array disposed at least partly within the arm, the conduit-array having a heat-removal fluid disposed therein and (ii) a pump mechanically coupled to the fluid for causing a flow thereof; and (b) operating the pump so as to cause the fluid to (i) flow distally through a first conduit of the conduit-array to the capsule-assembly, (ii) remove from the capsule-assembly, by forced convection, at least a portion of the heat produced by the illumination and/or imaging component and (iii) flow proximally from the capsule-assembly through a second conduit of the conduit-array to dissipate therein at least a portion of the heat removed from the capsule-assembly.

In some embodiments, at least 75%, by length, of the conduit array is disposed within the arm.

In some embodiments, causing the fluid to remove at least a portion of the heat from the capsule-assembly can include causing the fluid to flow through an interior volume of the capsule-assembly that is outside of the conduit-array, along a flow-path having a length of at least 5 mm.

In some embodiments, the flow-path through the interior volume of the capsule-assembly and outside of the conduit-array can have a length of that is equal to at least 50% of a diameter of the interior capsule-assembly.

In some embodiments, the fluid can flow through the interior of the capsule-assembly at a flow-rate of 10 to 200 ml/sec.

In some embodiments, a capsule comprising the heat-producing component can be fixedly disposed within the interior of the capsule-assembly to define an annular region outside of the capsule and within the capsule-assembly through which the fluid flows.

In some embodiments, an annular-region gap-thickness of between 0.05 mm and 0.6 mm can be sustained over at least 180 degrees of capsule circumference, for at least 1 cm of length of the capsule. In some embodiments, an annular-region gap-thickness of between 0.1 mm and 0.6 mm can be sustained over at least 180 degrees of capsule circumference, for at least 50% of a length of the capsule.

In some embodiments, a portion of the flowing fluid can longitudinally penetrate the annular region by at least 50% of a length of the capsule assembly.

In some embodiments, the removing from the capsule-assembly of at least a portion of the heat fluid flow can include maintaining a heat transfer coefficient for convective heat transfer from the capsule surface to the flowing fluid during operation of the surgical arm of between 10 and 200 $W/m^2k$.

According to embodiments disclosed herein, a surgical apparatus comprises: (a) a flexible arm comprising an arm section configured to be flexed by at least 90°; (b) a capsule-assembly distally connected to the arm, the capsule-assembly comprising an outer shell and a capsule disposed therein so as to form an annular gap between the outer shell and the capsule, the capsule including a heat-producing electronic and/or imaging component which is heat-producing during operation of the surgical apparatus; and (c) a forced-convection heat-removal system for removing heat from the capsule-assembly, the heat-removal system comprising: (i) a conduit-array, a lengthwise portion of which being at least partly disposed within and/or along the arm so as to span at least the flexing-configured arm section, the conduit-array comprising respective first and second distal orifices in direct fluid communication with the capsule-assembly and in indirect fluid communication with each other through the annular gap so that when a fluid disposed within the conduit-array is caused to exit the first distal orifice into an interior of the capsule assembly, the fluid traverses the annular gap and exits therefrom into the second distal orifice, and (ii). a pump displaced proximally from the flexing-configured arm section and mechanically coupled to the fluid.

In some embodiments, the pump can be selected and/or the conduit-array can be shaped for causing a fluid flow through the annular gap of 10 to 200 ml/sec.

In some embodiments, the capsule can be repeatably autoclavable.

In some embodiments, an annular-gap thickness of between 0.05 mm and 0.6 mm can be sustained over at least 180 degrees of capsule circumference, for at least 1 cm of length of the capsule. In some embodiments, an annular-gap thickness of between 0.1 mm and 0.6 mm can be sustained over at least 180 degrees of capsule circumference, for at least 50% of a length of the capsule.

In some embodiments, when a fluid is caused to flow through the conduit-array and into the annular gap, a portion of the flowing fluid can longitudinally penetrate the annular gap by at least 50% of a length of the capsule assembly.

In some embodiments, the pump can be selected and the conduit-array can be shaped for causing a fluid flow that maintains a heat transfer coefficient for convective heat transfer from the capsule surface to the flowing fluid during operation of the surgical apparatus of between 10 and 200 $W/m^2k$.

BRIEF DESCRIPTION OF THE DRAWINGS

The invention will now be described further, by way of example, with reference to the accompanying drawings, in which the dimensions of components and features shown in the figures are chosen for convenience and clarity of presentation and not necessarily to scale. Also, in some drawings the relative sizes of objects, and the relative distances between objects, may be exaggeratedly large or small for the sake of convenience and clarity of presentation. In the drawings:

FIG. 2B illustrates an angle of flexing of the bendable portion of the mechanical arm of FIG. 2A, relative to a central axis.

DETAILED DESCRIPTION OF THE EMBODIMENTS

Figure 1:
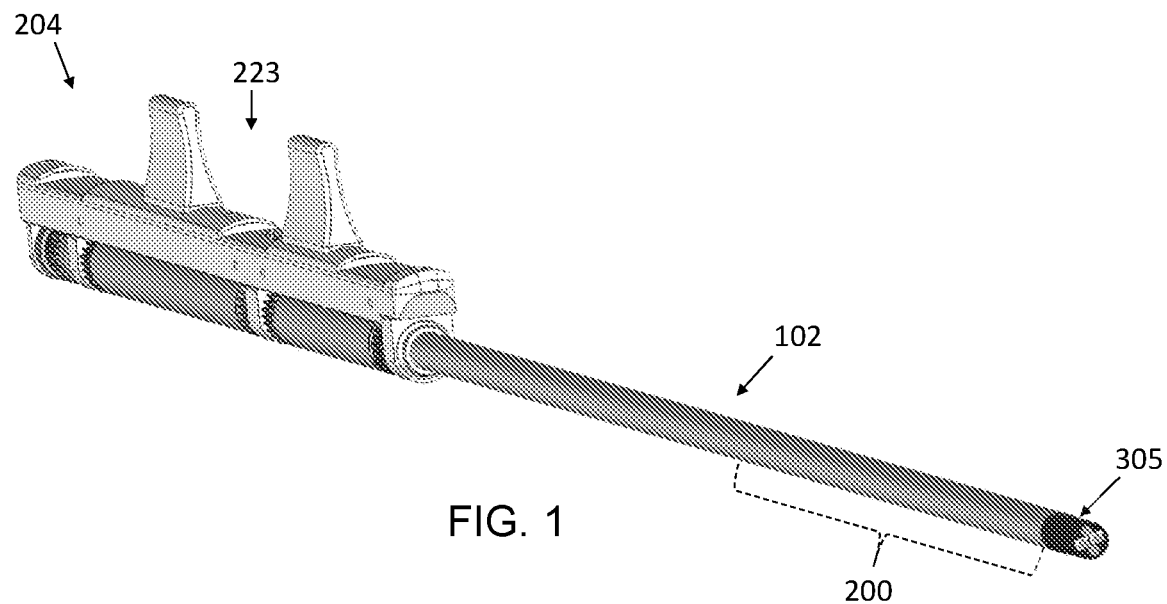
FIG. 1 shows a surgical arm unit according to embodiments of the present invention.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. Throughout the drawings, like-referenced characters are generally used to designate like elements.

Note: Throughout this disclosure, subscripted reference numbers (e.g., $10_1$) or letter-modified reference numbers (e.g., 100a) may be used to designate multiple separate appearances of elements in a single drawing, e.g. $10_1$ is a single appearance (out of a plurality of appearances) of element 10, and likewise 100a is a single appearance (out of a plurality of appearances) of element 100.

According to embodiments, a mechanical surgical arm can have a surgical device attached or otherwise connected to its distal end. The surgical device can be permanently attached, or it can be removably attached, i.e., detachably attached. In some embodiments, the surgical device can be removed from an arm after a surgical use and replaced by another device at the distal end of that arm, and/or the removed device after sterilization can be re-used on the same arm or on a different arm. Alternatively, or additionally, the surgical device can be removed after a surgical use and separately disinfected, e.g., autoclaved, and then returned to the distal end of an arm for a repeat use. Alternatively, or additionally, the surgical device can be permanently attached to the surgical arm and undergo sterilization as a whole for repeated use.

The 'distal' end of the arm is used herein to mean the end to which the surgical device is connected, i.e., the end which in normal surgical operation is furthest from an operator or user of a surgical apparatus comprising the arm. During a surgical procedure, the distal end is the first end of the arm that enters the patient's body. The term 'distal' is also used herein to indicate a direction towards the distal end. 'Proximal' as used herein obviously refers the end or direction which is opposite to the distal end or direction.

The term 'mechanical arm' is used herein to denote that the arm comprises mechanically controllable components, which can generally be controlled remotely using a control unit or input device mechanically and/or electronically connected to the arm. It can be desirable that a surgical arm be sized and/or shaped for insertion into a human body. For example, an arm can be sized and/or shaped for insertion through a laparoscopic port and/or for performing laparoscopic surgery. For example, an arm can be sized and/or shaped for insertion through a natural body orifice, e.g. vagina, anus, trachea, esophagus, ear canal. An arm can be flexible and/or articulated. An arm can be mechanical. The term 'flexible arm' is used herein to mean that at least a portion (or multiple portions) of the arm can be flexed, i.e., bent and/or swiveled to a desirable angle or direction, including to multiple flexing to form 's' shapes or other shapes, and including retroflexing, i.e., bending back by more than 180°. The term 'articulated arm' is used to mean that the arm includes one or more 'joints', i.e., mechanical assemblies which can bend and/or swivel. Thus, there is a great deal of overlap between the use of the terms 'flexible arms' and 'articulated arms', and for most or even all purposes the mechanical arms suitable for practicing the present invention are both flexible and articulated.

Use of the term "disposed within" throughout this disclosure and the appended claims should be understood to include, interchangeable, either one of "entirely disposed within" or "partially disposed within".

An example of a surgical device for use with a surgical arm is an endoscopic capsule which can which can be inserted into the body to provide healthcare providers with images of internal organs. An endoscopic capsule can include, without limitation, imaging arrangements (e.g., sensors for imaging), lighting and/or imaging components, and/or other electronic components. A non-limiting example of an imaging component or imaging arrangement is a 'chip-on-tip' camera or 'chip-on-tip' arrangement (e.g., sensors and/or other components) which can incorporate an imaging sensor. A chip-on-tip device is particularly suitable for inclusion in an endoscopic capsule disposed on the distal tip of a surgical arm. The capsule can also include a light source such as a light-emitting diode (LED) for illuminating internal organs which are imaged by the imaging component(s). Some or even all of these components can generate heat during a surgical procedure, as well as during use before and/or after a surgical procedure, to the extent that excess heat must be removed from the capsule in order to be able to continue the surgical procedure or other use of the capsule without risk from a 'hotspot'. It can be desirable to provide such a mechanical arm with a heat-removal system for preventing hotspots. Hotspots can form at the distal end of an arm where heat-generating components may be found, or elsewhere along the length of the arm (e.g., if too much heat is transferred too quickly during heat-removal so that it manifests as a local hotspot elsewhere within the arm itself or on the surface of the arm). An undesirable hotspot can be, for example, a location at which an arm or a component of the arm can reach a high local temperature, for example, 41° C. or higher, or 50° C. or higher, and therefore a heat removal system is designed to maintain temperatures below either or both of these thresholds.

Referring now to the figures and in particular to FIG. 1, an arm unit 204 includes a proximal end where a support unit 223 is attached to an arm 102, and a distal end where a surgical device such as an endoscopic capsule-assembly 305 is attached to the arm 102. The example of an endoscopic capsule-assembly is intended here to be non-limiting, as any appropriate heat-producing device may be used in practicing the embodiments of the invention. A bendable portion 200 of the arm 102 is located along the length of the arm, closer to the distal end. In embodiments, an arm 102 can be at least 50 cm in length, or at least 100 cm in length, or at least 120 cm in length, or at least 150 cm in length. In embodiments, a bendable portion 200 can be at least 50 cm in length, or at least 100 cm in length, or at least 120 cm in length, or at least 150 cm in length.

Figure 2A:
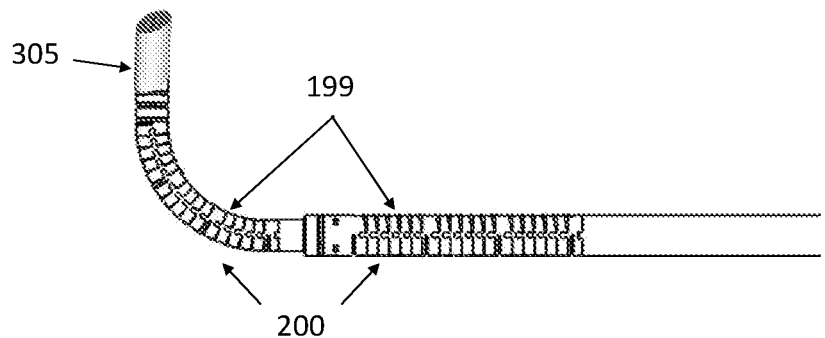
FIGS. 2A and 2B shows a mechanical arm with a bendable portion, according to embodiments of the present invention.
Figure 2B:
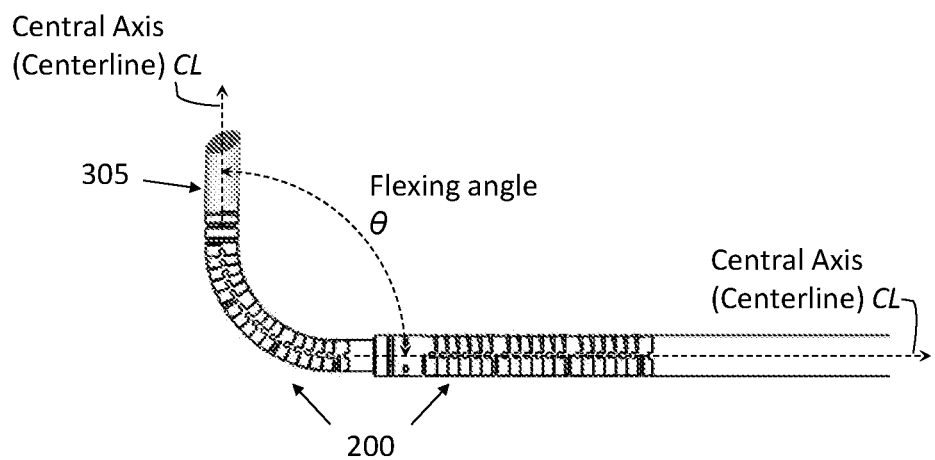

We now refer to FIGS. 2A and 2B. The bendable portion 200 of an arm 102 can comprise a series of stacked links 199 that provide external flexibility for the arm 102; an example of a plurality of stacked links 199 in a bendable portion 200 of an arm 102 An arm 102 or one or more segments of a bendable portion 200 can be flexed at angle θ of at least 90° relative to the central-axis centerline CL. In some embodiments, the bendable arm section can be configured to be flexed by at least 120°, or at least 150°, or at least 180°, at least 210°, at least 240°, or at least 270°. In some embodiments, bendable arm section can be configured to be flexed (i) by an angle of at least 90°, or at least 100°, or at least 110°, or at least 120°, or at least 130°, or at least 140°, or at least 150°, or at least 160°, or at least 170°, or at least 180°, or at least 190°, or at least 200°, or at least 210°, or at least 220°, or at least 230°, or at least 240°, or at least 250°, or at least 260°, or at least 270°. In some embodiments, the bendable portion 200 of an arm 102 can comprise non-contiguous segments. In other words, the bendable portion 200 can comprise multiple bendable portions with or without non bendable segments interposed therebetween. Note: Angles of flexing or retroflexing, throughout this specification and in the claims appended thereto, refer to angles measured between a centerline of a non-bendable portion of an arm that is proximal to one or more flexible elements and/or bending portions that are flexed, and a centerline of a non-bendable portion the same arm that is distal to the same one or more flexible elements and/or bending portions that are flexed, as illustrated in FIG. 2B.

In order to maintain the flexing capability of the arm, it is important for components of a heat-removal system installed in the arm to have similar flexing capabilities. It can be desirable for a heat-removal system and its components to be configured for use in an arm 102 such as the arm in the examples of FIGS. 2A and 2B. For example, if conduits (e.g., tubes, pipes, etc.) are employed to convey a heat-removal fluid, it can be desirable for the conduits to be flexible enough to remain useful when the arm 102 is flexed to its maximum possible extent. In embodiments of the present invention, conduits used to convey a heat-removal fluid retain fluid-conveying capabilities for their entire respective lengths. In some embodiments, these capacities may be reduced by as much as 30% but not more, or as much as 20% but not more, or as much as 10% but not more, when the flexible/articulated arm is bent to its maximum possible extent. In embodiments, a conduit can be produced from multi-layered tubes. Multi-layered tubes can include an additional strengthening/support layer between layers of flexible material. A support layer can include, as a non-limiting example, a polymer-based wire, e.g., a nylon wire.

Figure 3:
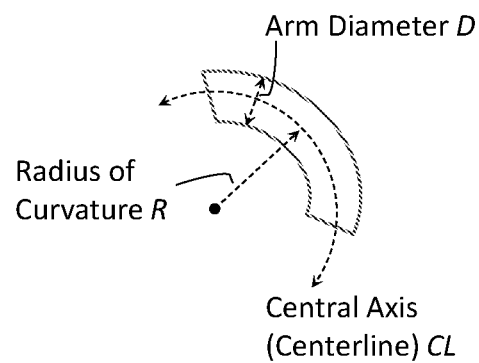
FIG. 3 shows a schematic drawing illustrating a central axis of a mechanical arm, a diameter of a section of mechanical arm, and a radius of curvature for a bendable portion of a mechanical arm as used in this disclosure.

The mechanical characteristics of an arm 102 and of conduits running longitudinally therein, e.g., flexibility, can be assessed in terms of the minimum radius of curvature of the arm 102. Any portion or segment in the bendable portion 200 of the arm 102 can be bent to a radius of curvature R, which for the purposes of this disclosure is calculated as the radius of curvature of the central axis, or centerline CL, as illustrated for the sake of clarity in FIG. 3. Lower limits on the radius of curvature R, in embodiments, can be defined by the size and specific design of the bendable portion and its component links, as well as by the diameter D of the arm 102. For example, the radius of curvature R can be limited to being at most 3 times the diameter of the arm 102, or at most twice the diameter of the arm 102, or at most 1.5 times the diameter of the arm, or at most 1.25 times the diameter of the arm 102.

The diameter D of a bendable portion 200 (or any segment thereof) of a mechanical surgical arm 102 suitable for surgery and especially suitable for minimally invasive surgery can be in the range of 6 to 12 mm, or 7 to 11 mm, or 8 to 10 mm, or 8 to 9 mm. Different segments can be designed to have different D values. The 'length' of a link 199, i.e., when incorporated in a bendable portion 200 that is not bent, can be in the range of 1.5 to 4 mm, or 2.0 to 3.25 mm, or 2.25 to 2.75 mm. Each link 199, when the corresponding bendable portion 200 (or segment thereof) is maximally flexed or bent, can correspond to an arc of 5° to 15°, or 6° to 13°, or 7° to 11°, or 8° to 10°. The resulting radius of curvature, R, can be in the range of 10 to 20 mm, or 11 to 16 mm, or 12 to 15 mm, or 13 to 14 mm. In some embodiments, the flexing of an arm can be limited by the flexibility of the conduits of a heat-removal system, in which case the resulting radius of curvature, R, can be in the range of 10 to 30 mm, or 15 to 20 mm.

Figure 4:
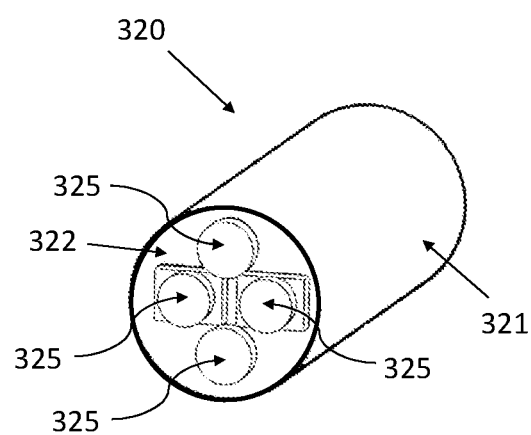
FIG. 4 is a schematic perspective view of a capsule comprising one or more electronic and/or imaging components, according to embodiments of the present invention.

Referring now to FIG. 4, a capsule 320 includes a capsule-covering 323 (not shown in FIG. 4) having a circumferential outer surface 321, and a distal outer face 322. The circumference is illustrated for convenience as cylindrical, but as discussed earlier, the cross-sectional shape is unimportant. In addition, the ratio of length to width or thickness, and the regularity of the eternal surface are all non-limiting examples for the sake of simplification of the illustration. The distal outer surface 322 includes at least an external portion of each of one or more electronic and/or imaging components 325. In embodiments, the capsule can use 'chip-on-tip' imaging and/or lighting technology for endoscopic use. The skilled artisan will understand that a capsule comprising electronic and/or imaging components can be used for other purposes as well, and would fall within the scope of the present invention. The capsule 320 is preferably sealed so as to be liquid-tight, and in preferred embodiments is fluid-tight with respect to, for example, a cooling fluid for removing heat from the capsule, or water vapor at temperatures and pressures used in autoclave sterilizing. Non-limiting examples of temperatures and pressures used in autoclave sterilizing include 115° C. at 690 mbar (millibar gauge), 121° C. at 1,034 mbar, and 132° C. at 1,862 mbar. Thus, the capsule 320 is, preferably, autoclavable in that it remains fluid-tight with respect to water vapor at one or more of the foregoing examples of temperature and pressure used in autoclaving. Further, the capsule 320 is, preferably, repeatably autoclavable in that it remains fluid-tight with respect to water vapor at one or more of the foregoing examples of temperature and pressure used in autoclaving over at least 10 cycles of autoclaving, or over at least 25 cycles of autoclaving, or over at least 50 cycles of autoclaving, or over at least 100 cycles of autoclaving.

Figure 5:
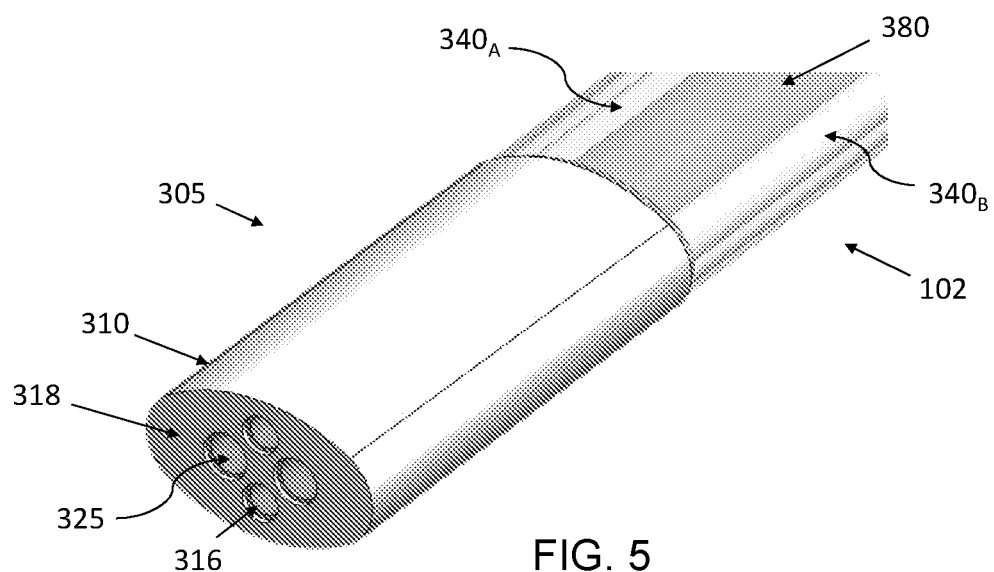
FIGS. 5 and 6 are schematic views of the distal portions of surgical arms each comprising a capsule assembly, according to embodiments of the present invention.
Figure 6:
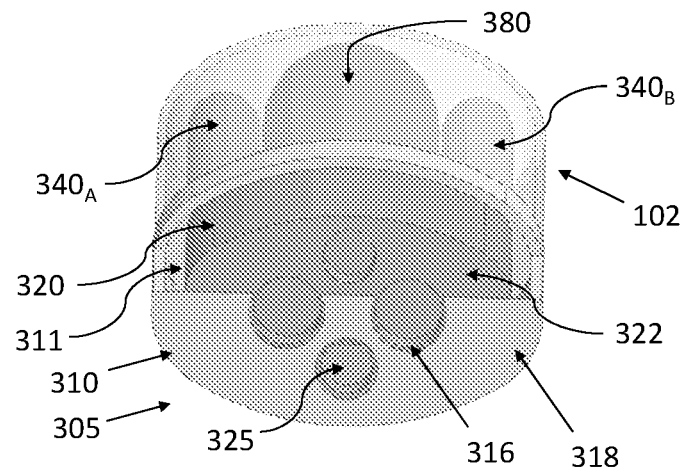

We now refer to FIGS. 5 and 6. FIG. 5 shows a capsule assembly 305 attached to the distal end of a mechanical arm 102. An endoscopic capsule assembly 305 can have any practical cross-section and the shape of the capsule is merely a design choice; examples of an elliptical cross-section and a circular cross-section are shown in various figures, and no special meaning should be attached to the use of either one of the design options in any of the examples described herein. FIG. 5 shows a capsule assembly 305 that appears much longer than it is wide or thick, and FIG. 6 shows a capsule assembly 305 that appears to have a very small length relative to that of FIG. 5; however, both figures are merely schematic illustrations and there is no meaning to the respective dimensions shown. In both FIGS. 5 and 6, the exterior of the arm 102 is transparent for illustration purposes and shows first and second fluid-conduits $340_A$, $340_B$, and a central core 380. The central core 380 as presented here is a simplification of the various elements installed in a surgical arm 102, and does not represent an actual single conveyance. Thus, the central core 380 can include one or more individual longitudinal elements, along with other arm components. In embodiments, the central core 380 is disposed within a mechanical surgical arm and generally runs along part of, most of, or all of the length of the arm. The central core 380 can include, for example, and without limitation: electric power conveyance for powering a surgical device, e.g., powering components of the distally-attached capsule assembly 305; electronic transmission medium for issuing control instructions to the capsule assembly 305 and/or for transmitting data, e.g., images, from the capsule assembly 305; and mechanical elements for flexing the arm 102. The first conduit $340_A$ is provided for the transport of a heat-removing fluid to the capsule assembly 305. In embodiments, the fluid (not shown) can include a heat-transfer gas such as, for example, and not exhaustively: air, nitrogen or helium, or a liquid such as, for example, an oil-based liquid or an aqueous liquid. The second conduit $340_B$ is provided for the transport of a heat-removing fluid away from the capsule assembly 305.

Figure 7:
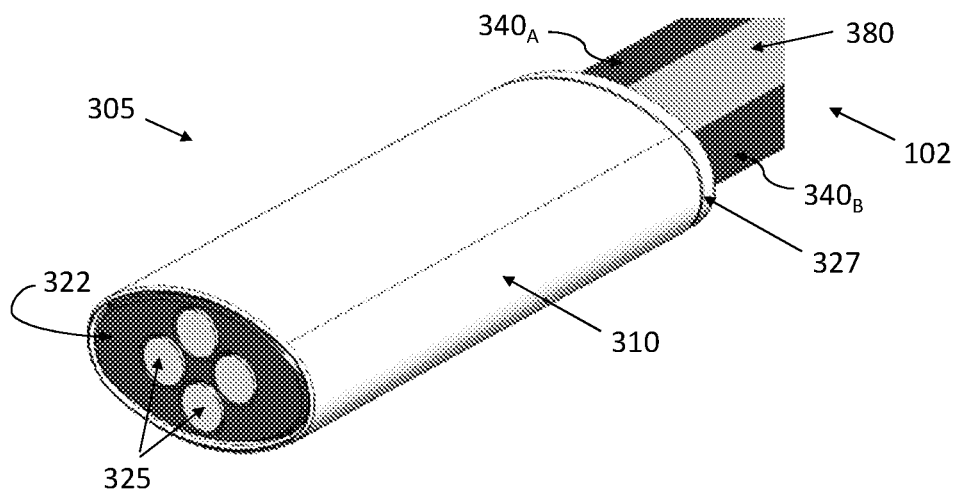
FIG. 7 shows a distal portions of an exemplary surgical arm comprising a capsule assembly that does not include a distal covering, according to embodiments of the present invention.

The capsule assembly 305 can include a capsule 320 disposed therewithin, such as, for example, the capsule 320 of FIG. 4, and this is illustrated in the cutaway drawing of FIG. 6. As can be seen in FIG. 6, an outer shell 310 surrounds the capsule 320 so as to form an annular gap between the capsule 320 and the shell 310. The term 'annular' as used in this disclosure and in the claims appended thereto is intended more broadly than a strictly 'circular' sense of the word, and it should be interpreted as meaning 'surrounding', as in 'the annular gap 311 surrounds the capsule 320' in FIG. 6—despite the capsule 320 being exemplarily drawn as elliptical and the capsule 320 not being necessarily circular in cross-section. Further, the annular gap 311 may in some designs be of uneven thickness around the circumference, i.e., perimeter, of the capsule 320, and/or along the (longitudinal) length of the capsule 320 or capsule assembly 305. Structurally, the outer shell 310 as illustrated has the following three design features, inter alia: it establishes the annular gap 311 between the shell 310 and the capsule 320, it helps to hold the capsule 320 in a desired position within the shell 310 while maintaining the gap 311 as required, and seals the annular 311 gap from the environment at least circumferentially and at the distal end. The functionality of the gap 311 will be described hereinbelow in connection with FIGS. 8-10. Still referring to FIGS. 5 and 6, the shell 310 may in some designs be formed so as to include a distal covering 318. Openings 316 in the distal covering 318 can be formed so as to provide a seal around each of the electronic and/or imaging components 325 on the distal outer surface 322 of the capsule 320 and thus seal the annular gap 311 of the capsule from the environment. Such seals are preferably liquid-tight. In some embodiments the seals are also air-tight. In other designs, including in the design shown in FIG. 7, a shell can be without a distal covering 318. In such designs (not shown) the distal outer surface 322 of the capsule 320 can be exposed to the environment, and the capsule is instead sealed around the capsule circumference, e.g., at or near the distal end of the capsule 320. In some designs, the capsule can be suitably seated within respective annular 'rings' at the distal and proximal ends of the shell 310. In an example (not shown), the rings are formed as part of the shell 311 and serve to hold the capsule 320 in a desired position within the shell 310, while maintaining the gap 311 around the capsule 320 for most of its length, e.g., except where the circumferential surface 321 of the capsule engages the 'rings'. In the example of FIG. 7, the capsule 320 is sealed against the distal outer surface 322 at its distal end and against a connector element 327 that connects the capsule 320 to the arm 102.

Figure 8:
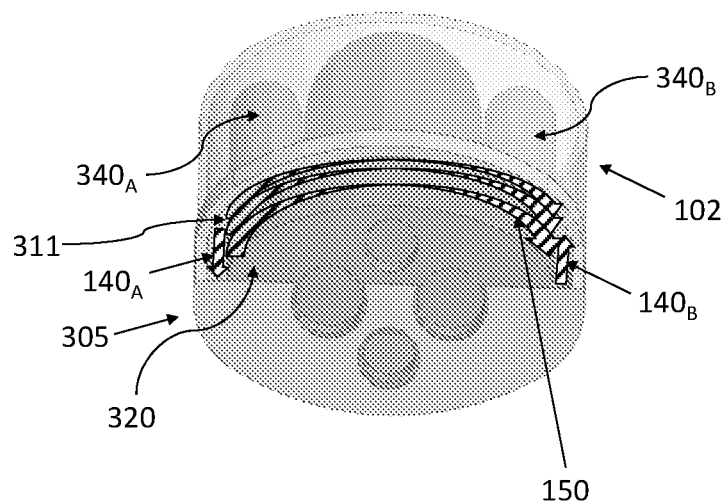
FIG. 8 shows the surgical arm distal-portion and capsule assembly of FIG. 6, indicating a fluid flow, according to embodiments of the present invention.
Figure 9:
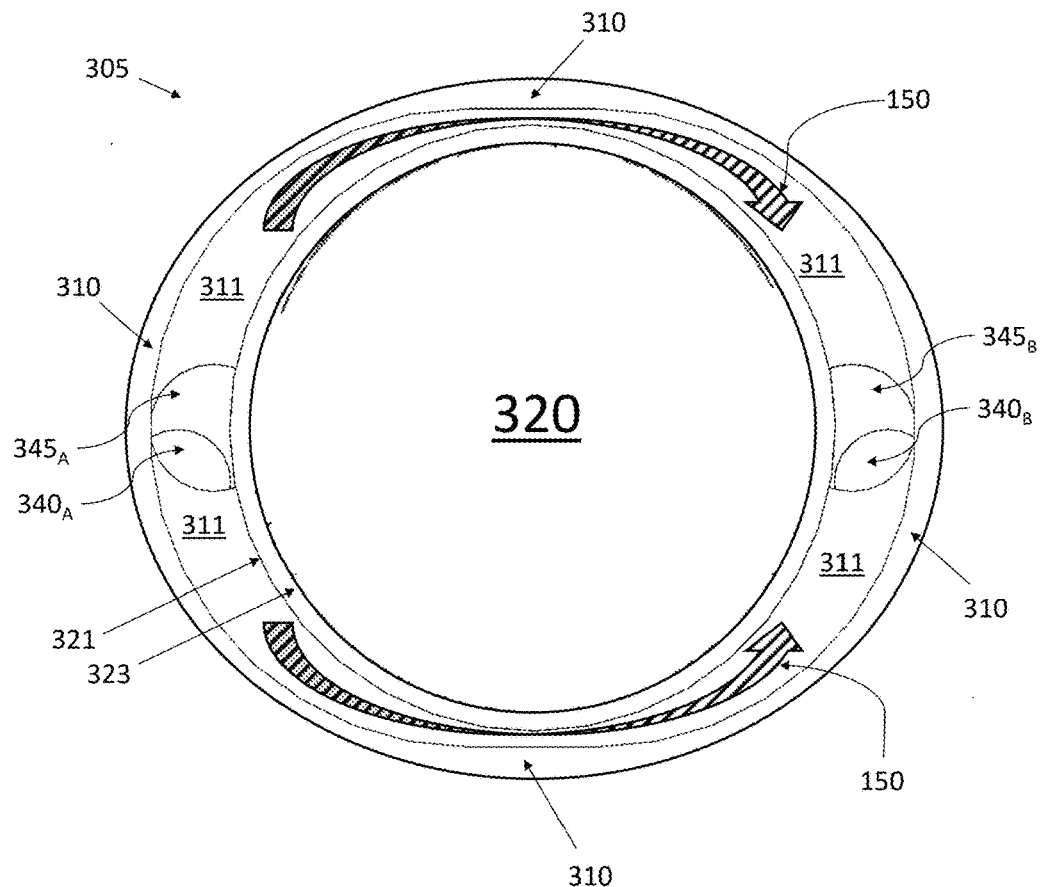
FIG. 9 is a schematic cross-sectional view of a proximal portion of a capsule assembly, according to embodiments of the present invention.

We now refer to FIGS. 8 and 9. FIG. 8 imposes a fluid-flow scheme on the cutaway diagram of FIG. 6, and FIG. 9 shows a schematically-drawn cross-sectional view of a proximal portion of a capsule-assembly 305. Inflow-arrow $140_A$ indicates a flow of a fluid entering the interior of the capsule-assembly 305, specifically entering into the annular gap 311 surrounding the capsule-covering 323. As shown in FIG. 8, the fluid enters the interior of the capsule-assembly 305 from the distal-opening $345_A$ of the first fluid-conduit $340_A$. As indicated by throughflow-arrows 150 in both FIGS. 8 and 9, the fluid flows around the capsule 320, and exits the interior of the capsule assembly via the distal-opening $345_B$ of the second fluid-conduit $340_B$. The direction of flow of the fluid exiting the interior of the capsule-assembly 305 is indicated by outflow-arrow $140_B$. It should be clear from FIGS. 8 and 9 that the illustrated elements can be used to provide and maintain a flow-path for a fluid, where the flow-path includes (i) a distal flow through the first fluid-conduit $340_A$ to its distal opening $345_A$, (ii) an 'annular' (as defined herein) flow through the portion of the interior of the capsule assembly 305 that is not occupied by the capsule 320, and (iii) a proximal flow through the second fluid-conduit $340_B$ from its distal opening $345_B$. The fluid-flow can be maintained by a positive pressure applied to or in the first fluid-conduit $340_A$. The portion of a fluid flow-path that is inside of the capsule-assembly-interior and outside of any of the conduits, i.e., the portion indicated by arrows 150, has a length of at least 5 mm or at least 1 cm. The length can be selected to ensure that the fluid flow is suitable distributed through the capsule assembly 305, and contacts as much as possible of the outer surface 321 of the capsule-covering 323. In some embodiments, as illustrated in FIGS. 11 and 12A, a flow channel 348 can be shaped to route the fluid flow from the from the distal-opening $345_A$ of the first fluid-conduit $340_A$ to the gap 311, and from the gap 311 to the from the distal-opening $345_B$ of the second fluid-conduit $340_B$.

We note that the conventions used in these figures, e.g., 'first' and 'second' conduits or openings, along with the specifically left-to-right direction of flow through the annular gap, are merely for convenience and have no importance, and in other examples the left-right orientation and flow direction are switched.

Figure 10:
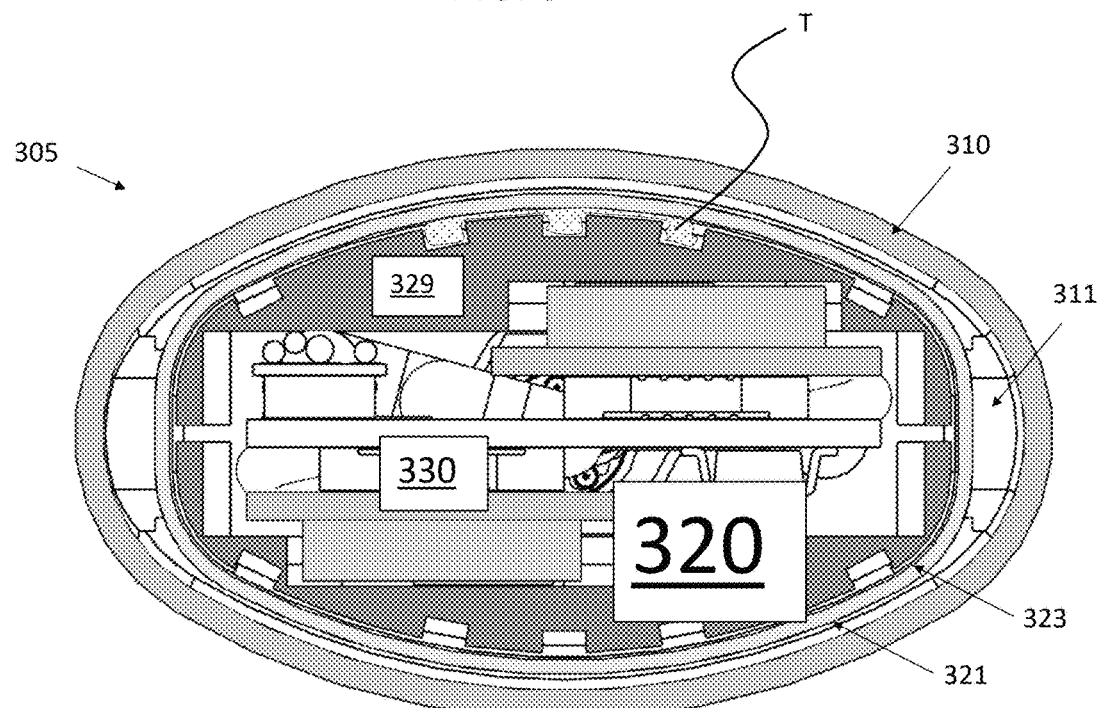
FIGS. 10 and 11 are schematic cross-sectional views of a capsule-assembly according to embodiments of the present invention.

FIG. 10 shows a cross-section of another example of a capsule-assembly 305 according to embodiments. An annular gap 311 surrounds the capsule 320 so as to mediate between the capsule 320 and the outer shell 310. The outer shell is preferably fabricated from a thermally insulating material such as, for example, a thermoplastic characterized by a thermal conductivity of less than 1 W/mK or under 0.5 W/mK. This characterization includes thermoplastic polymers such as, and not exhaustively, polypropylene, acrylonitrile-butadiene-styrene (ABS), polysulfone, or polyethylene. The capsule 320 includes an outer covering 323 having an outer surface 321. It will be apparent to the skilled artisan that the 'outer covering 323' of the capsule 320 is, from a different perspective, an 'inner shell' of the capsule-assembly 305 in that it is surrounded by the outer shell 310, and thus the term 'inner shell' as used in this disclosure or in the appended claims can be understood to mean an outer covering of a capsule, which, when the capsule is installed in a capsule-assembly as the term is used herein, is a capsule-covering or 'outer covering' of the capsule and surrounded by, or configured to be surrounded by, an outer shell. The outer covering 323 is preferably fabricated from a material characterized by a thermal conductivity of at least 200 W/mK such as aluminum, copper, silver, or gold. The arrangement of an outer covering 323 of high thermal conductivity and an outer shell 310 having a low thermal conductivity is useful in transferring heat from within the capsule 320 into the annular gap 311 while preventing as much as possible of the transferred heat from leaving the capsule 320 through the outer shell 311. The electrical components 330 of the capsule 320, which include electronic components, are arranged to be in contact with an inner capsule casing 329 which can be useful in transferring heat from the components 330 to the capsule-covering 323 and/or for providing internal structural support for the capsule-covering 323. The inner capsule casing 329 is preferably fabricated from a material characterized by a thermal conductivity of at least 200 W/mK such as aluminum, copper, silver, or gold.

Figure 11:
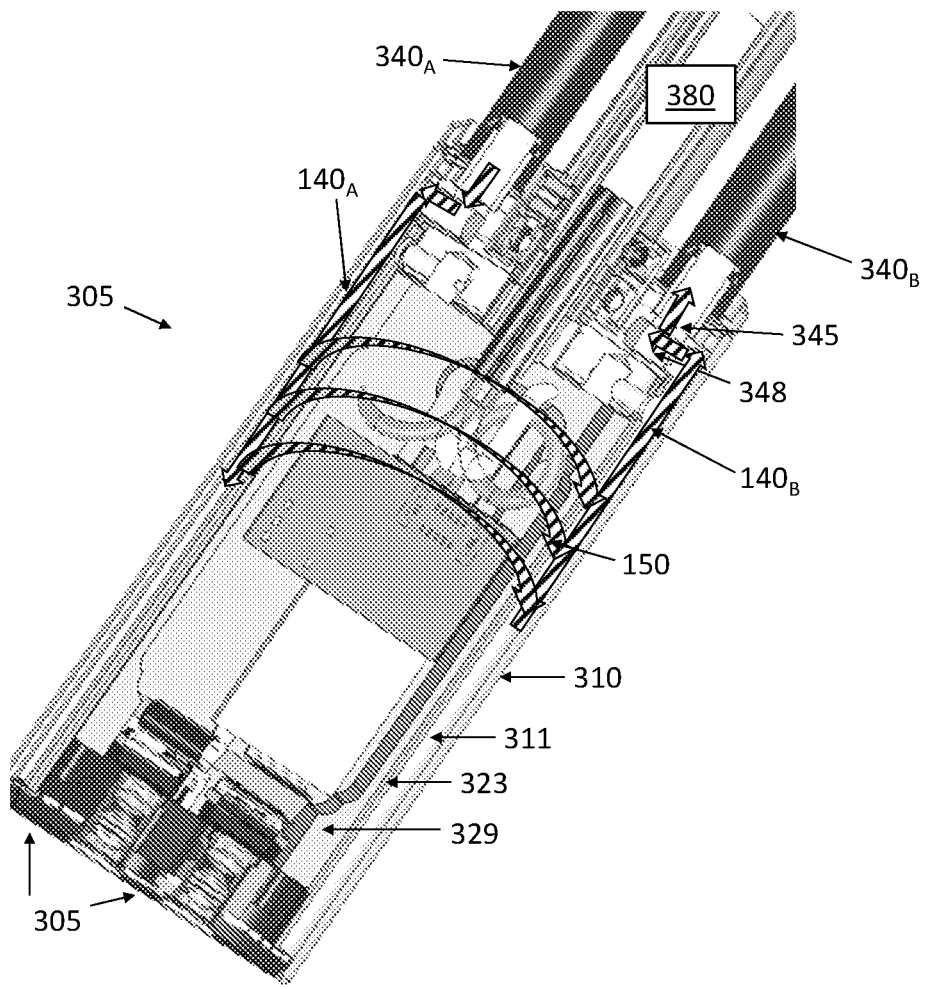
Figure 12A:
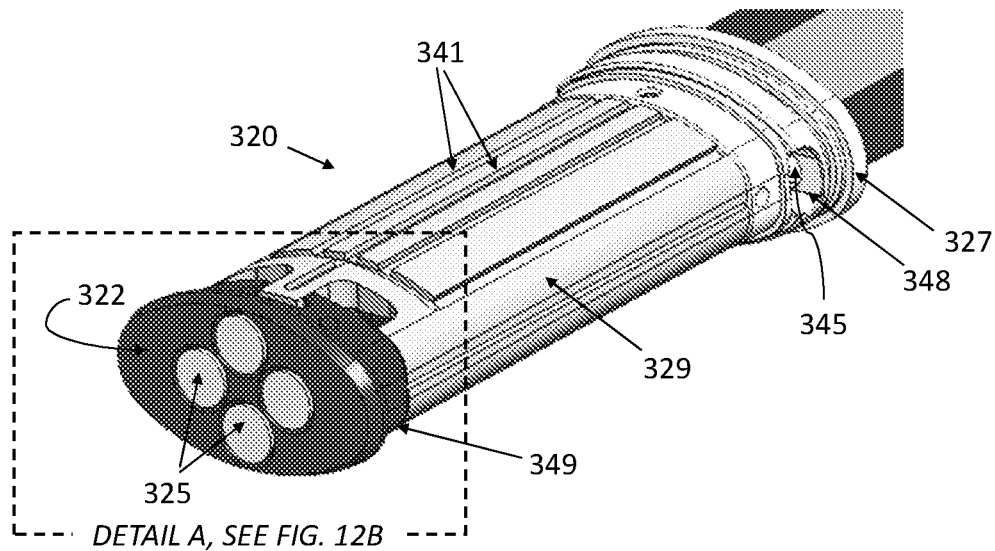
FIG. 12A shows the distal portions of the surgical arm of FIG. 7 with the outer shell and the capsule-covering removed.

FIG. 11 is another cross-section of the capsule-assembly 305 of FIG. 10, orthogonal to the cross-section view of FIG. 10, in order to better show the flow of fluid into, through and out of the capsule-assembly 305. FIG. 11 illustrates an exemplary shape of flow channels 348, which routes the fluid in-flow $140_A$ from the distal-opening $345_A$ of the first fluid-conduit $340_A$ to the gap 311, and, on an opposite side of the capsule assembly 305, the fluid out-flow $140_B$ from the gap 311 to the distal-opening $345_B$ of the second fluid-conduit $340_B$. As discussed above, the arrows of throughflow 150 represent the circumferential movement of the fluid through the annular gap 311.

Figure 12B:
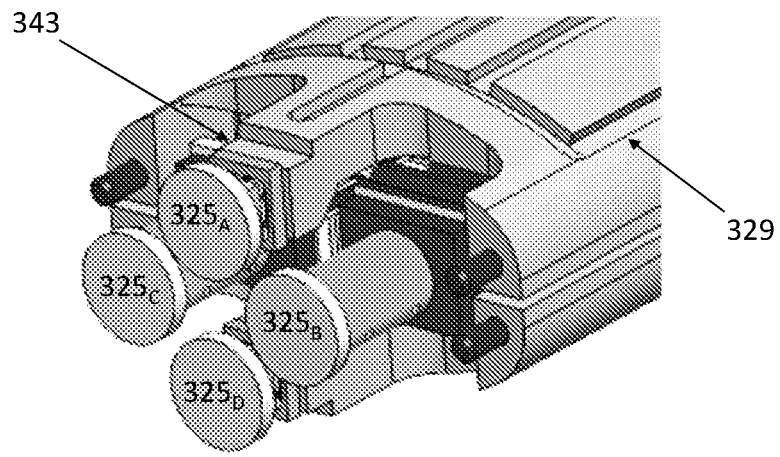
FIG. 12B shows 'DETAIL A' of FIG. 12A with the distal cap removed.

FIG. 12A shows the capsule 320 of the arm of FIG. 7, with both the outer shell 310 of the capsule assembly 305 and the capsule-covering 323 removed to show the inner capsule casing 329, the proximally-disposed connector element 327 that connects the capsule 320 to the arm 102, and the distal cap 349. The distal cap includes structural features that surround at least a portion of each of the electronic and/or imaging components 325, not including the exposed distal surfaces. For clarity, it is pointed out that the distal cap 349 is a component of a capsule 320 while the distal covering 318 is an optional structural feature of an outer shell 310. A capsule 320 generally includes a distal cap 349 regardless of whether a parent capsule-assembly 305 includes an outer shell 310 shaped to have a distal covering 318. In some embodiments, as illustrated in FIG. 12A, the outward-facing surface of the inner capsule casing 329 includes grooves 341, or striations or other equivalent channels or troughs, in which a thermal paste T can be applied to improve thermal transmittance from the inner capsule casing 329 to the capsule-covering 323 (which is not shown in FIG. 12A) The thermal paste, for example an alumina-based thermal paste or any other thermal gel with thermal conductivity of more than 5 W/mK or more than 7 W/mK, can be spread in a thin layer on the outer layer of the inner capsule casing 329 in addition to the quantity applied in the grooves, so as to improve overall heat removal from the capsule 320, in which heat-generating components (including, inter alia, the electronic and/or optical components 325 or other electronic components 330 within the capsule interior as shown in FIGS. 10 and 11) are in contact, optionally via the thermal paste, with the inner capsule casing 329, which is in contact with the capsule-covering 323. As discussed hereinabove, both the inner capsule casing 320 and the capsule-covering 323 are fabricated from metallic materials characterized by high thermal conductivity, and thus heat is transferred efficiently, according to embodiments, from the various components 325, 330 to the outer surface 321 of the capsule-covering 323 from where the heat is removed by convection as will be described herein. FIG. 12B shows a detail (DETAIL A) of FIG. 12A with the distal cap 349 removed for purposes of illustration. The inner capsule casing 329 can be shaped so as to be in direct contact with one or more of the distally-disposed electronic and/or optical components 325, as clearly shown with respect to components $325_A$, $325_D$ in FIG. 12B.

Figure 13:
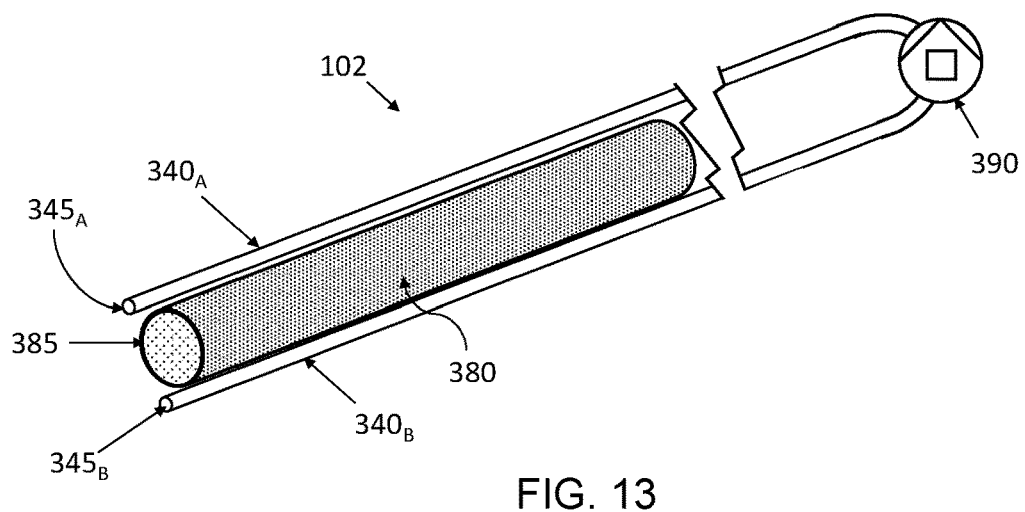
FIG. 13 is a schematic perspective view of a conduit array for transport of a fluid in a surgical arm.
Figure 14:
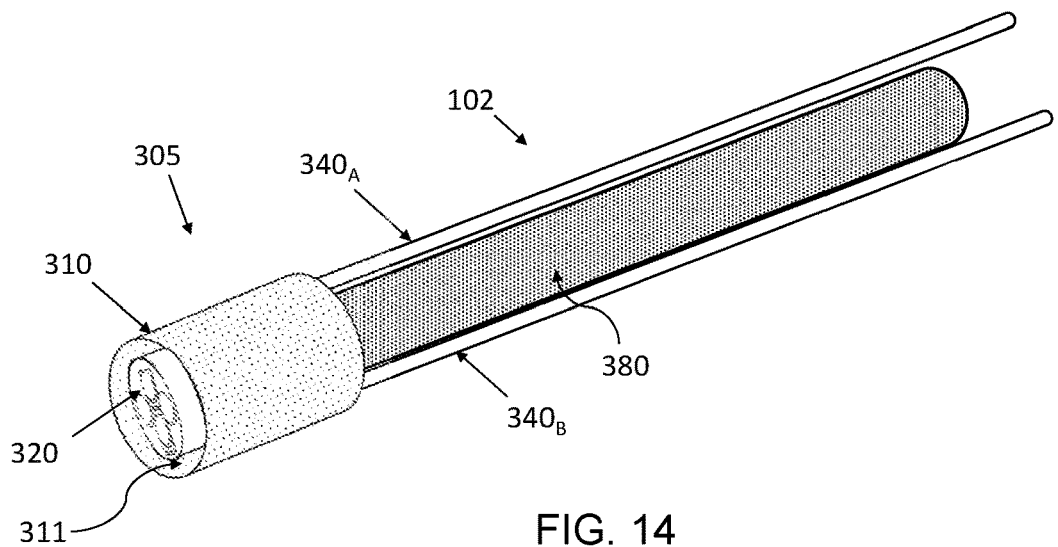
FIGS. 14 and 15 are schematic perspective views of conduit arrays for transport of a fluid in a surgical arm for removing heat from a capsule assembly, according to embodiments of the present invention.
Figure 15:
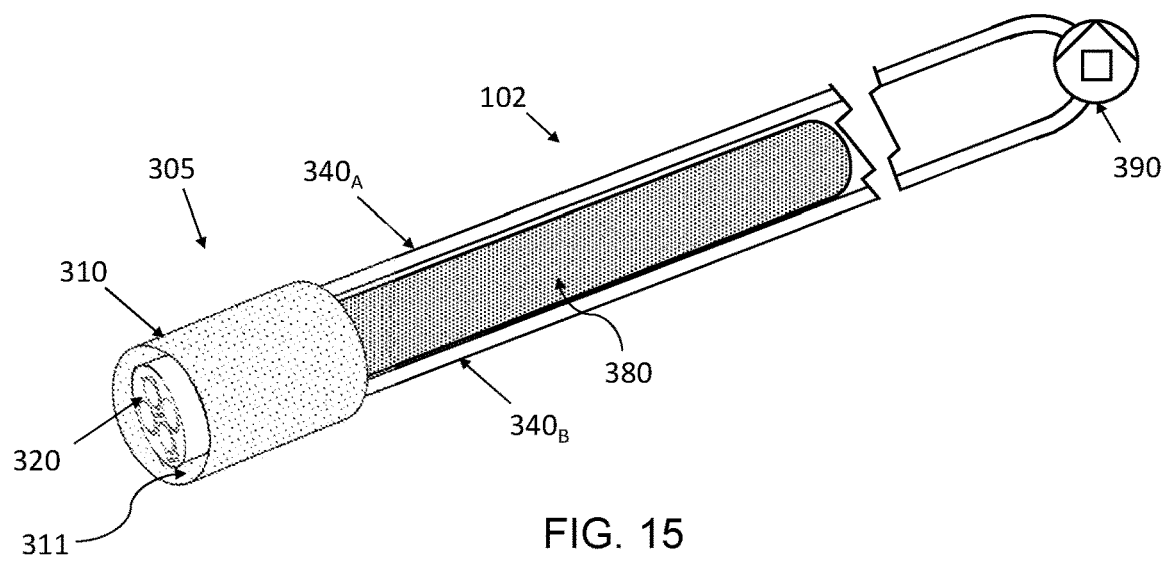

Reference is now made to FIGS. 13-15 in which examples of components of surgical apparatuses are illustrated schematically.

FIG. 13 shows an array of conduits comprising first and second conduits $340_A$, $340_B$, the conduits having respective distal openings $345_A$, $345_B$. The conduits $340_A$, $340_B$, are positioned alongside a central core 380; while illustrated as being on opposite sides of the central core 380, the relative spacing of the two conduits $345_A$, $345_B$ can be different in accordance with design needs. In embodiments, the conduit array can be disposed within a surgical arm 102, e.g., alongside the elements of the central core 380, and run along the length of part of, most of, or all of the arm 102. In embodiments, the conduit array can be disposed within a bendable portion 200 of a surgical arm 102 and run along the length of part of, most of, or all of the bendable portion 200. As illustrated, the portion of the conduit array within the arm can comprise two (or more) conduits 340 such that the conduit array is spanning the arm or a portion thereof at least twice. The conduit array is preferably formed to have appropriate longitudinal flexibility, using a material that provides suitable resistance to 'closing off' or 'choking off' of the fluid conveyance within the constituent conduit(s) when flexed in accordance with the arm's requirements for flexibility as described hereinabove, e.g., the bendable portion 200 can be flexed by at least 90°, or at least 135°, or at least 180°, at least 210°, at least 240°, or at least 270°. In other words, any conduits 340 of the conduit array are to be bendable to the radii of curvature discussed hereinabove while being able to maintain a fluid flow therewithin.

In FIG. 13, first and second conduits $340_A$, $340_B$ comprise a single, continuous conduit (e.g., a single flexible tube), but in other embodiments the conduits $340_A$, $340_B$ can comprise multiple tubes joined together. The conduit array is in mechanical communication with a pump 390, which is preferably a positive-displacement pump. An example of a suitable pump is a peristaltic pump which can deployed to create a fluid flow through the conduit array without having direct physical contact with the fluid itself. In some embodiments, the pump 390 can be a centrifugal pump such as, for example, an impeller pump.

Referring now to FIG. 14, a conduit array comprising first and second conduits $340_A$, $340_B$ is used to facilitate a flow of fluid to remove heat from a capsule 320 disposed within an outer shell 310 to collectively form a capsule assembly 305. The capsule assembly 305 is shown schematically without sealing elements at its distal end, e.g., a distal covering 318. The flow-path of the fluid from the distal openings $345_A$, $345_B$ of the first and second conduits $340_A$, $340_B$ through the annular gap 311 within the interior of capsule assembly 305 is not shown but can be in accordance with the flow-paths $140_A$, $140_B$, 150 illustrated in FIGS. 8, 9 and/or 11.

FIG. 15 shows a conduit array comprising first and second conduits $340_A$, $340_B$, also used to convey a flow of fluid so as to remove heat from a capsule 320 disposed within an outer shell 310 to form a capsule assembly 305. In FIG. 15, a closed (e.g., liquid-tight and/or fluid-tight) loop for flow of the fluid comprises: first conduit $340_A$, annular gap 311 within the capsule assembly (and around the capsule 320), and second conduit $340_B$. The fluid flow-path is continuous throughout the conduit-assembly and discontinuous, with respect to the conduit assembly, as it traverses the interior of the capsule assembly 305. The portion of the flow-path within the interior of the capsule assembly 305 is preferably equal to at least 50%, or at least 75%, or at least 90% of a diameter of the interior of the capsule assembly 305.

As disclosed hereinabove, the conduit array traverses part of, most of, or all of the length of the arm 102. The in-arm portions of the closed flow-loop can comprise at least 75%, or at least 85%, or at least 95%, or at least 99%, by length, of the closed flow-loop.

A pump 390 maintains a positive pressure in the first conduit $340_A$ to maintain the flow throughout the loop. In embodiments, a portion of the conduit array that is contact with the pump 390 is outside of the arm; for example, the pump can be in support unit 223. The actual location of the pump is a function of design choice: In non-limiting examples of surgical apparatus designs, the pump itself can be disposed in support unit 223 and can be powered externally, or the pump can be external to both the arm 102 and support unit 223 while being powered from within support unit 223 or from elsewhere.

Transfer of heat from the capsule 320 of FIG. 15, and generally from within the capsule assembly 305, is accomplished as follows: A fluid is caused to flow (by the pumping action of pump 390) through a first conduit $340_A$ of a conduit array, and exit from a distal outlet $345_A$ of the conduit $340_A$ into the annular gap 311 in the interior of the capsule assembly between the capsule 320 and the outer shell 310. Thus, the pump 390 is part of a circulation mechanism configured for introducing a fluid into the annular gap 311 via a first distal orifice $345_A$ of the conduit $340_A$ and for evacuating said fluid from the annular gap 311 via a second distal orifice $345_B$ of the conduit $340_B$, such that the fluid absorbs heat generated by heat-producing components, e.g., electronic and/or imaging components 325 by passing through the annular gap 311. The fluid flows through the narrow annular gap 311, which preferably has a thickness between 0.05 mm and 0.3 mm over at least half of the circumference of the capsule 320, or optionally between 0.05 mm and 0.4 mm, or between 0.1 mm and 0.3 mm, or between 0.1 mm and 0.4 mm, or between 0.2 mm and 0.3 mm, or between 0.2 mm and 0.4 mm, for at least half the length of the capsule, or for at least 1 cm, at least 2 cm, at least 3 cm, at least 4 cm, or at least 5 cm of the length of the capsule 320. In embodiments, the fluid flow through the interior of the capsule assembly 305 in terms of fluid volume per second is between 10 and 200 ml/sec, or between 30 and 150 ml/sec, or between 50 and 100 ml/sec.

In embodiments, elements of the fluid transport regime (fluid volume and fluid flow rate, together with component and pump design) are selected to ensure that the fluid longitudinally 'penetrates' the annular gap 311 (i.e., from distal outlet $345_A$ of first conduit $340_A$ in a proximal portion of the capsule assembly 305) by a distance equal to at least 50% of the length or at least 70% or at least 90% of the capsule assembly 305—while flowing around the capsule to remove heat therefrom and before exiting via the second distal outlet $345_B$ of the second conduit $340_B$. The heat removal is accomplished primarily via heat transfer by forced convection of heat from the capsule to the flowing fluid. During operation of the heat-removal system while the arm is operating, the fluid flow preferably maintains a heat transfer coefficient for convective heat transfer from the capsule surface to the flowing fluid during operation of the arm unit 204 of between 10 and 200 W/m²k or between 50 and 100 W/m²k, where the area component refers to the surface area of the capsule 320.

The heated fluid traverses the second conduit $340_B$, which, like the first conduit $340_A$ spans a part of, or most of, or all of the length of the arm 102, and loses heat to the conduit wall. The material of the conduit wall is selected, in addition to the flexibility criteria previously mentions, for its heat transfer/absorption characteristics. For example, if the conduit material has too high a heat-transfer coefficient, the heat of the heated flowing fluid will be lost too 'quickly' and a hotspot could form in the second conduit $340_B$ proximally from the capsule assembly. If the conduit material has too low a heat-transfer coefficient, the heat of the heated flowing fluid will be lost too 'slowly' and even after traversing the entire conduit assembly to the pump 390 and distally back to the capsule assembly 305, the fluid could be incompletely cooled by the conduit walls. In some designs, all of the heat removed from the capsule is absorbed by the wall of the second conduit $340_B$ as the fluid flows proximally from the capsule assembly 305 to the pump 390. In some designs, the heat is absorbed the walls of both the second conduit $340_B$ (as the fluid flows proximally from the capsule assembly 305 to the pump 390) and the first conduit 340A (as the fluid flows distally from the pump 390 back to the capsule assembly 305). In embodiments, at least 70% or at least 80% or at least 90% or at least 95% or at least 99% of the heat absorbed by the fluid in the capsule assembly 305 is lost as the heated fluid traverses the conduit array.

It will be clear to the skilled artisan that any of the features described in connection with any of the figures can be combined with each other with the scope of the present invention even if not explicitly combined in this disclosure.

First Additional Discussion of Embodiments

According to embodiments, a surgical instrument comprises: (a) a flexible and/or articulated arm having a bendable portion configured to be flexed (i) by an angle of at least 90°, or at least 100°, or at least 110°, or at least 120°, or at least 130°, or at least 140°, or at least 150°, or at least 160°, or at least 170°, or at least 180°, or at least 190°, or at least 200°, or at least 210°, or at least 220°, or at least 230°, or at least 240°, or at least 250°, or at least 260°, or at least 270°, and/or (ii) such that a radius of curvature after the flexing is at most 3 times the diameter of the bendable portion, or at most twice the diameter of the bendable portion, or at most 1.5 times the diameter of the bendable portion, or at most 1.25 times the diameter of the bendable portion; (b) a capsule-assembly distally connected to the mechanical arm, the capsule-assembly comprising a liquid-tight shell defining a capsule-assembly-interior, a heat-producing component being disposed within the capsule-assembly-interior; and (c) a forced-heat-convection system comprising (i) conduit-section(s) in fluid communication with the capsule-assembly-interior and (ii) a pump mechanically coupled to a fluid disposed within the conduit-section(s).

In some embodiments, the flexible arm can comprise a mechanical arm. In some embodiments, the flexible arm can be articulated.

In some embodiments, the surgical instrument can be an imaging instrument. In some embodiments, the surgical instrument can comprise a chip-on-tip imaging instrument. In some such embodiments, the surgical instrument can additionally comprise a light-emitting diode.

In some embodiments, the heat generating component can be selected from a group consisting of an image sensor, an image processor, an electrode, an illumination source, a laser diode, an ultrasound transducer, and a data processing element. In some such embodiments, the image sensor can be a CMOS image sensor. In some such embodiments, the illumination device can include at least one light-emitting diode.

In some embodiments, the capsule assembly can comprise a capsule disposed therewithin so as to form an air gap between the capsule and the shell, wherein heat is removed via the air gap being formed between a capsule-assembly-interior and conduit-array.

In some embodiments, the pump can be a positive-displacement pump. In some embodiments, the pump can be a centrifugal pump.

Second Additional Discussion of Embodiments

According to embodiments, surgical apparatus is disclosed comprising: (a) a flexible arm; (b) a capsule-assembly distally connected to the arm, the capsule-assembly comprising a liquid-tight shell defining a capsule-assembly-interior, heat-producing component being disposed within the capsule-assembly-interior; and (c) a conduit-array, the conduit-array and a portion of the capsule-assembly-interior that is outside of the conduit-array collectively forming a liquid-sealed closed flow-loop for convective removal of heat from the capsule-assembly-interior, the liquid-sealed closed flow-loop comprising arm-disposed section(s) of the conduit-array which: (i) are at least partly disposed along and/or within the arm; and (ii) collectively longitudinally span, twice and in-parallel, at least a lengthwise majority of the flexible arm.

In some embodiments, the surgical apparatus can further comprise a positive displacement pump for causing a fluid to flow through the liquid-sealed closed flow-loop to remove by forced-convention, from the capsule-assembly-interior, heat generated by one or more of the imaging and/or electronic component(s).

In some embodiments, the arm-disposed sections can comprise at least 75%, or at least 85%, or at least 95%, or at least 99%, by length, of the liquid-sealed closed flow-loop.

In some embodiments, a portion of the liquid-sealed closed flow-loop inside of the capsule-assembly-interior and outside of the conduit-array can have a length of at least 5 mm or at least 1 cm. In some embodiments, a portion of the liquid-sealed closed flow-loop inside of the capsule-assembly-interior and outside of the conduit-array can have a length of that is equal to at least 50%, or at least 75%, or at least 90% of a diameter of the capsule-assembly interior.

In some embodiments, the pump can be selected and the liquid-sealed closed flow-loop can be shaped for causing a fluid flow through the capsule-assembly-interior of 10 to 200 ml/sec, or 30 to 150 ml/sec, or 50 to 100 ml/sec.

In some embodiments, a capsule can be fixedly disposed within the capsule-assembly-interior to define an annular region outside of the capsule and within the shell.

In some embodiments, the imaging and/or electronic component(s) can be disposed within the capsule so as to seal the imaging and/or electronic component(s) from the annular region. In some embodiments, the capsule can be repeatably autoclavable.

In some embodiments, an annular-region gap-thickness of between 0.05 mm and 0.6 mm can be sustained over at least 180 degrees of capsule circumference, for at least 5 cm of length of the capsule-assembly and/or for at least 50% of a length of the capsule-assembly. In some embodiments, an annular-region gap-thickness of between 0.1 mm and 0.6 mm can be sustained over at least 180 degrees of capsule circumference, for at least 5 mm, or at least 10 mm, or at least 15 mm, or at least 25 mm, of length of the capsule-assembly and/or for at least 50% of a length of the capsule-assembly.

In some embodiments, a fluid can be caused to flow through the conduit-array and into the annular region, a portion of the flowing fluid longitudinally penetrates the annular region by at least 50% of a length of the capsule assembly.

In some embodiments, the pump can be selected and the liquid-sealed closed flow-loop can be shaped for causing a fluid flow that maintains a heat transfer coefficient for convective heat transfer from the capsule surface to the flowing fluid during operation of the surgical apparatus of between 10 and 200 W/m$^2$k or between 50 and 100 W/m$^2$k.

In some embodiments, the pump can be selected and the liquid-sealed closed flow-loop can be shaped to maintain a maximum external-surface temperature of the capsule-assembly during operation of the surgical apparatus of less than 50° C. In some embodiments, the pump can be selected and the liquid-sealed closed flow-loop can be shaped to maintain a maximum external-surface temperature of the capsule-assembly during operation of the surgical apparatus of less than 41° C.

In some embodiments, the arm can have a length of at least 50 cm. In some embodiments, In some such embodiments, the arm can include a remotely manipulable portion having a length of at least 50 cm.

In some embodiments, the conduit-array can comprise a single conduit.

In some embodiments, the pump can be a peristaltic pump.

In some embodiments, the heat-producing component can include at least one of an imaging component and an electronic component.

In some embodiments, the arm can be mechanical and/or articulated.

Third Additional Discussion of Embodiments

According to embodiments, surgical apparatus is disclosed comprising: (a) a flexible arm; (b) capsule-assembly distally connected to the arm, the capsule-assembly comprising a liquid-tight shell defining a capsule-assembly-interior, heat-producing imaging and/or electronic component(s) being disposed within the capsule-assembly-interior; and (c) one or more conduit-sections which: (i) are at least partly disposed along and/or within the arm, (ii) collectively longitudinally span, twice and in-parallel, at least a majority of a lengthwise majority of the arm, and (iii) reach the capsule-assembly. The surgical apparatus additionally comprises (d) a pump for forced heat-convection cooling of the capsule-assembly interior, mechanically coupled to fluid disposed within the conduit-section(s). The surgical apparatus is configured such that the one or more conduit-sections are part of a liquid-sealed closed fluid-flow loop that is thermally coupled to the capsule assembly.

In some embodiments, the pump can be selected and the liquid-sealed closed flow-loop can be shaped for causing a fluid flow through the capsule-assembly-interior of 10 to 200 ml/sec, or 30 to 150 ml/sec, or 50 to 100 ml/sec.

In some embodiments, the liquid-sealed closed fluid loop can comprise a portion of the capsule-assembly-interior that is outside of the one or more conduit-sections.

In some embodiments, a capsule can be fixedly disposed within the capsule-assembly-interior to define an annular region outside of the capsule and within the shell.

In some embodiments, the pump can be selected and the liquid-sealed closed flow-loop can be shaped for causing a fluid flow that maintains a heat transfer coefficient for convective heat transfer from the capsule surface to the flowing fluid during operation of the surgical apparatus of between 10 and 200 W/m$^2$k or between 50 and 100 W/m$^2$k.

In some embodiments, the pump can be selected and the liquid-sealed closed flow-loop can be shaped to maintain a maximum external-surface temperature of the capsule-assembly during operation of the surgical apparatus of less than 50° C. In some embodiments, the pump can be selected and the liquid-sealed closed flow-loop can be shaped to maintain a maximum external-surface temperature of the capsule-assembly during operation of the surgical apparatus of less than 41° C.

In some embodiments, the arm can have a length of at least 50 cm.

In some embodiments, the arm can comprise an arm section configured to be flexed by at least 90°, or at least 135°, or at least 180°, or at least 210°.

In some embodiments, the arm section can have a length of at least 50 cm.

In some embodiments, the one or more conduit-sections can comprise a single continuous conduit.

In some embodiments, the pump can be a peristaltic pump or an impeller pump.

Fourth Additional Discussion of Embodiments

According to embodiments, surgical apparatus is disclosed comprising: (a) a flexible arm; (b) a capsule-assembly distally connected to the arm, the capsule-assembly comprising an outer shell and a capsule disposed therein so as to form an annular gap between the outer shell and the capsule, the capsule including heat-producing electronic and/or imaging components sealed therewithin from the annular gap; and (c) first and second conduit sections having respective first and second distal orifices in direct fluid communication with the capsule-assembly and in indirect fluid communication with each other through the annular gap so that when a fluid is caused to exit the first distal orifice into an interior of the capsule assembly, the fluid traverses the annular gap and exits therefrom into the second distal orifice.

In some embodiments, an annular-region gap-thickness of between 0.05 mm and 0.3 mm can be sustained over at least 180 degrees of capsule circumference, for at least 5 cm of length of the capsule-assembly and/or for at least 50% of a length of the capsule-assembly.

In some embodiments, the annular gap can have a thickness of at least 0.05 mm and at most 0.3 mm over at least 75% or at least 90% or at least 99% of capsule circumference for at least 2 cm of length of the capsule-assembly and/or for at least 20% of a length of the capsule-assembly.

In some embodiments, the first and second distal orifices can be at a distance of at least 5 mm or at least 1 cm from each other. In some embodiments, the first and second distal orifices can be at a distance from each other that is equal to at least 50%, or at least 75%, or at least 90% of a diameter of the capsule-assembly interior.

In some embodiments, the capsule can be repeatably autoclavable.

In some embodiments, the arm can comprise an arm section configured to be flexed by at least 90°, or at least 120°, or at least 150°, or at least 180°, or at least 210°, or at least 240°, or at least 270°.

In some embodiments, the first and second conduits can both be parts of a single continuous conduit.

Fifth Additional Discussion of Embodiments

According to embodiments, surgical apparatus is disclosed comprising: (a) a flexible arm comprising an arm section configured to be flexed by at least 90°; (b) a capsule-assembly distally connected to the arm, the capsule-assembly including a heat-producing component which is heat-producing during operation of the surgical apparatus; and (c) a fluid transport system for removing heat from the capsule-assembly, the fluid transport system comprising: (i) a pump displaced proximally from the flexing-configured arm section, and (ii) a conduit-array at least partly disposed within and/or along the arm so as to span at least the flexing-configured arm section.

In some embodiments, the conduit-array can form a fluid-path that is continuous proximally from the capsule assembly through the pump and distally back to the capsule assembly, and discontinuous within the capsule assembly.

In some embodiments, the flexing-configured arm section can be configured to be flexed by at least 120°, or at least 150°, or at least 180°, or at least 210° or at least 240°, or at least 270°.

In some embodiments, the flexing-configured arm section can comprise a retroflex section configured to transition in and out of a retroflex configuration.

In some embodiments, the pump can be a peristaltic pump.

In some embodiments, the fluid-transport system can be selected and the conduit array can be shaped for causing a fluid flow through an interior volume of the capsule-assembly of 10 to 200 ml/sec, or 30 to 150 ml/sec, or 50 to 100 m/sec.

In some embodiments, it can be that when the flexing-configured arm is flexed, the fluid-path remains continuous proximally from the capsule assembly through the pump and distally back to the capsule assembly.

In some embodiments, it can be that wherein when the flexing-configured arm is flexed, a fluid capacity of the fluid-path is not reduced by more than 30%, or by more than 20%, or by more than 10%.

In some embodiments, the capsule-assembly can comprise a capsule that includes the heat-producing component, and the removal of heat from the capsule assembly is by convectively absorbing heat from the capsule in a fluid pumped through the fluid-transport system.

In some embodiments, the fluid-transport system can be configured such that at least 70% or at least 80% or at least 90% or at least 95% of the absorbed heat is lost by the pumped fluid as the pumped fluid traverses the conduit-array.

In some embodiments, the fluid-transport system can be configured such that a first portion of the absorbed heat is lost as the pumped fluid traverses proximally from the capsule assembly through the pump and a second portion of the absorbed heat is lost as the pumped fluid traverses distally from the pump to the capsule assembly.

Sixth Additional Discussion of Embodiments

A method is disclosed according to embodiments, for removing heat from a flexible surgical arm, wherein the arm has a heat-producing illumination and/or imaging component disposed in a capsule-assembly connected distally to the arm. The method comprises: (a) thermally coupling, to the capsule assembly, a forced-convection heat dissipation system comprising (i) a conduit-array disposed at least partly within the arm, the conduit-array having a heat-removal fluid disposed therein and (ii) a pump mechanically coupled to the fluid for causing a flow thereof; and (b) operating the pump so as to cause the fluid to (i) flow distally through a first conduit of the conduit-array to the capsule-assembly, (ii) remove from the capsule-assembly, by forced convection, at least a portion of the heat produced by the illumination and/or imaging component and (iii) flow proximally from the capsule-assembly through a second conduit of the conduit-array to dissipate therein at least a portion of the heat removed from the capsule-assembly.

In some embodiments, the pump can be a peristaltic pump.

In some embodiments, at least 75%, or at least 85%, or at least 95%, or at least 99%, by length, of the conduit array can be disposed within the arm.

In some embodiments, causing the fluid to remove at least a portion of the heat from the capsule-assembly can include causing the fluid to flow through an interior volume of the capsule-assembly that is outside of the conduit-array, along a flow-path having a length of at least 5 mm or at least 1 cm.

In some embodiments, the flow-path through the interior volume of the capsule-assembly and outside of the conduit-array can have a length of that is equal to at least 50%, or at least 75%, or at least 90% of a diameter of the interior capsule-assembly.

In some embodiments, the fluid can flow through the interior of the capsule-assembly at a flow-rate of 10 to 200 ml/sec, or 30 to 150 ml/sec, or 50 to 100 ml/sec.

In some embodiments, a capsule comprising the heat-producing illumination and/or imaging component can be fixedly disposed within the interior of the capsule-assembly to define an annular region outside of the capsule and within the capsule-assembly through which the fluid flows.

In some embodiments, the heat-producing illumination and/or imaging component can be disposed within the capsule so as to seal the heat-producing illumination and/or imaging component from the annular region.

In some embodiments, the capsule can be repeatably autoclavable.

In some embodiments, an annular-region gap-thickness of between 0.05 mm and 0.6 mm can be sustained over at least 180 degrees of capsule circumference, for at least 5 cm of length of the capsule-assembly and/or for at least 50% of a length of the capsule-assembly. In some embodiments, an annular-region gap-thickness of between 0.1 mm and 0.6 mm can be sustained over at least 180 degrees of capsule circumference, for at least 5 mm, or at least 10 mm, or at least 15 mm, or at least 25 mm, of length of the capsule-assembly and/or for at least 50% of a length of the capsule-assembly.

In some embodiments, a portion of the flowing fluid can longitudinally penetrate the annular region by at least 50% of a length of the capsule assembly.

In some embodiments, the removing from the capsule-assembly of at least a portion of the heat fluid flow can include maintaining a heat transfer coefficient for convective heat transfer from the capsule surface to the flowing fluid during operation of the surgical arm of between 10 and 200 $W/m^2k$ or between 50 and 100 $W/m^2k$.

In some embodiments, the removing from the capsule-assembly of at least a portion of the heat fluid flow can include maintaining a maximum external-surface temperature of the capsule-assembly during operation of the surgical apparatus of less than 50° C. In some embodiments, the removing from the capsule-assembly of at least a portion of the heat fluid flow can include maintaining a maximum external-surface temperature of the capsule-assembly during operation of the surgical apparatus of less than 41° C.

In some embodiments, the arm can have a length of at least 50 cm. In some such embodiments, the arm can include a remotely manipulable portion having a length of at least 50 cm. In some embodiments, the conduit-array can comprise a single conduit.

Seventh Additional Discussion of Embodiments

According to embodiments, surgical apparatus is disclosed comprising: (a) a flexible arm comprising an arm section configured to be flexed by at least 90°; (b) a capsule-assembly distally connected to the arm, the capsule-assembly comprising an outer shell and a capsule disposed therein so as to form an annular gap between the outer shell and the capsule, the capsule including a heat-producing electronic and/or imaging component which is heat-producing during operation of the surgical apparatus; and (c) a forced-convection heat-removal system for removing heat from the capsule-assembly, the heat-removal system comprising: (i) a conduit-array at least partly disposed within and/or along the arm so as to span at least the flexing-configured arm section, the conduit-array comprising respective first and second distal orifices in direct fluid communication with the capsule-assembly and in indirect fluid communication with each other through the annular gap so that when a fluid disposed within the conduit-array is caused to exit the first distal orifice into an interior of the capsule assembly, the fluid traverses the annular gap and exits therefrom into the second distal orifice, and (ii) a pump displaced proximally from the flexing-configured arm section and mechanically coupled to the fluid.

In some embodiments, at least 85%, or at least 95%, or at least 99%, by length, of the conduit-array is disposed within the arm.

In some embodiments, a flow-path of the fluid traversing the annular gap can have a length of at least 5 mm or at least 1 cm. In some such embodiments, the flow-path of the fluid traversing the annular gap can have a length of that is equal to at least 50%, or at least 75%, or at least 90% of an interior diameter of the capsule-assembly.

In some embodiments, the pump can be selected and the conduit-array can be shaped for causing a fluid flow through the annular gap of 10 to 200 ml/sec, or 30 to 150 ml/sec, or 50 to 100 ml/sec.

In some embodiments, the capsule can be repeatably autoclavable.

In some embodiments, an annular-gap thickness of between 0.05 mm and 0.6 mm can be sustained over at least 180 degrees of capsule circumference, for at least 5 cm of length of the capsule-assembly and/or for at least 50% of a length of the capsule-assembly. In some embodiments, an annular-gap thickness of between 0.1 mm and 0.6 mm can be sustained over at least 180 degrees of capsule circumference, for at least 5 mm, or at least 10 mm, or at least 15 mm, or at least 25 mm, of length of the capsule-assembly and/or for at least 50% of a length of the capsule-assembly.

In some embodiments, when a fluid is caused to flow through the conduit-array and into the annular gap, a portion of the flowing fluid longitudinally penetrates the annular gap by at least 50% of a length of the capsule assembly.

In some embodiments, the pump can be selected and the conduit-array can be shaped for causing a fluid flow that maintains a heat transfer coefficient for convective heat transfer from the capsule surface to the flowing fluid during operation of the surgical apparatus of between 10 and 200 $W/m^2k$ or between 50 and 100 $W/m^2k$.

In some embodiments, the pump can be selected and the conduit-array can be shaped to maintain a maximum external-surface temperature of the capsule-assembly during operation of the surgical apparatus of less than 50° C.

In some embodiments, the pump can be selected and the conduit-array can be shaped to maintain a maximum external-surface temperature of the capsule-assembly during operation of the surgical apparatus of less than 41° C.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons skilled in the art to which the invention pertains.

Any feature or combination of features described in the present document may be combined with any feature or combination of features described in U.S. patent application Ser. No. 15/915,237 filed on Mar. 8, 2018 and published as US Patent Publication US20180256246A1; and U.S. patent application Ser. No. 15/454,123 filed on Mar. 9, 2017 and published as US Patent Publication US20170258539A1; U.S. patent application Ser. No. 15/501,862 filed on Feb. 6, 2017 and published as US Patent Publication US20170239005A1; all of which are hereby incorporated by reference herein as if fully set forth in their entirety.

In the description and claims of the present disclosure, each of the verbs, "comprise", "include" and "have", and conjugates thereof, are used to indicate that the object or objects of the verb are not necessarily a complete listing of members, components, elements or parts of the subject or subjects of the verb. As used herein, the singular form "a", "an" and "the" include plural references unless the context clearly dictates otherwise. For example, the term "a marking" or "at least one marking" may include a plurality of markings.

The invention claimed is:

1. A system for removing heat from a heat-producing component of a mechanical arm, the system comprising:
   a. an inner shell surrounding the distal heat-producing component to define a capsule;
   b. an inner casing disposed in the capsule to be in at least indirect thermal communication with the heat-producing component and with the inner shell, wherein an outward-facing surface of the inner casing includes grooves and/or troughs;
   c. an outer shell surrounding the inner shell to form an annular gap therebetween;
   d. a conduit-array, comprising respective first and second distal orifices in fluid communication with said annular gap and with each other therethrough; and
   e. a circulation mechanism configured for introducing a fluid into said annular gap via said first distal orifice and for evacuating said fluid from said annular gap via said second distal orifice, such that said fluid absorbs heat generated by said heat-producing component by passing through said annular gap.

2. The system according to claim 1, wherein a lengthwise portion of the conduit-array is at least partly disposed within and/or along the mechanical arm so as to span at least one flexible arm section.

3. The system of claim 1, wherein the heat-producing component constitutes a part of an imaging arrangement.

4. The system of claim 1, wherein the heat-producing component constitutes a part of a chip-on-tip arrangement.

5. The system of claim 1, wherein the circulation mechanism comprises a pump displaced proximally from the at least one flexible arm section and mechanically coupled to the fluid.

6. The system of claim 5, wherein the pump is selected and the conduit-array is shaped for causing a fluid flow through the interior of the outer shell of 10 to 200 ml/sec.

7. The system of claim 5, wherein the pump is selected and the conduit-array is shaped for causing a fluid flow that maintains a heat transfer coefficient for convective heat transfer from a surface of the capsule to the flowing fluid during operation of the heat-producing component of between 10 and 200 $W/m^2k$.

8. The system of claim 1, wherein a lengthwise majority of the conduit-array is disposed within the arm.

9. The system of claim 1, wherein the inner casing comprises a metal characterized by thermal conductivity of at least 200 W/mK.

10. The system of claim 1, additionally comprising a thermal gel or thermal paste disposed in the grooves and/or troughs in at least indirect thermal communication with the inner shell and with one of: the heat-producing component and the inner casing.

11. The system of claim 10, wherein the thermal gel or thermal paste has a thermal conductivity of more than 5 W/mK.

12. The system of claim 1, wherein the conduit-array comprises one or more arm-disposed section(s) of the conduit-array which, collectively, longitudinally span, twice and in-parallel, at least a lengthwise majority of the at least one flexible arm section.

13. A method of removing heat from a flexible surgical arm, the arm having a heat-producing component disposed in a capsule-assembly connected distally to the arm, the method comprising:
   a. thermally coupling, to the capsule assembly, a forced-convection heat dissipation system comprising (i) a conduit-array disposed at least partly within the arm, the conduit-array having a heat-removal fluid disposed therein and (ii) a pump mechanically coupled to the fluid for causing a flow thereof; and
   b. operating the pump so as to cause the fluid to (i) flow distally through a first conduit of the conduit-array to the capsule-assembly, (ii) remove from the capsule-assembly, by forced convection, at least a portion of the heat produced by the heat-producing component and (iii) flow proximally from the capsule-assembly through a second conduit of the conduit-array to dissipate therein at least a portion of the heat removed from the capsule-assembly,
   wherein (i) the capsule-assembly comprises (A) an inner shell surrounding the distal heat-producing component, (B) an inner casing disposed in the capsule to be in at least indirect thermal communication with the heat-producing component and with the inner shell, an outward-facing surface of the inner casing including grooves and/or troughs, and (C) an outer shell surrounding the inner shell to form an annular gap therebetween, and (ii) the removing at least the portion of the heat by forced convection includes circulating the fluid through the annular gap.

14. The method of claim 13, wherein an annular-region gap-thickness of between 0.05 mm and 0.6 mm is sustained over at least 180 degrees of capsule circumference, for at least 1 cm of length of the capsule.

15. The method of claim 13, additionally comprising, before the thermally coupling: applying a thermal gel or thermal paste in the grooves or troughs.

16. Surgical apparatus comprising:
   a. a flexible arm comprising an arm section configured to be flexed by at least 90°;
   b. a capsule-assembly distally connected to the arm, the capsule-assembly comprising an outer shell and a capsule disposed therein so as to form an annular gap between the outer shell and the capsule, the capsule including (i) a heat-producing electronic and/or imaging component which is heat-producing during operation of the surgical apparatus, (ii) an inner shell surrounding the heat-producing component, and (iii) an inner casing disposed in the capsule to be in at least indirect thermal communication with the heat-producing component and with the inner shell, wherein an outward-facing surface of the inner casing includes grooves and/or troughs; and
   c. a forced-convection heat-removal system for removing heat from the capsule-assembly, the heat-removal system comprising:
      i. a conduit-array, a lengthwise portion of which being at least partly disposed within and/or along the arm so as to span at least the arm section, the conduit-array comprising respective first and second distal orifices in direct fluid communication with the capsule-assembly and in indirect fluid communication with each other through the annular gap so that when a fluid disposed within the conduit-array is caused to exit the first distal orifice into an interior of the capsule assembly, the fluid traverses the annular gap and exits therefrom into the second distal orifice, and
      ii. a pump displaced proximally from the flexing-configured arm section and mechanically coupled to the fluid.

17. The surgical apparatus of claim 16, wherein an annular-gap thickness of between 0.05 mm and 0.6 mm is sustained over at least 180 degrees of capsule circumference, for at least 1 cm of length of the capsule.

18. The surgical apparatus of claim 16, wherein an annular-gap thickness of between 0.1 mm and 0.6 mm is sustained over at least 180 degrees of capsule circumference, for at least 50% of a length of the capsule.

19. The surgical apparatus of claim 16, additionally comprising a thermal gel or thermal paste disposed applied in the grooves and/or troughs in at least indirect thermal communication with the inner shell and with one of: the heat-producing component and the inner casing.

20. The system of claim 19, wherein the thermal gel or thermal paste has a thermal conductivity of more than 5 W/mK.

\* \* \* \* \*